(12) United States Patent
Pucci et al.

(10) Patent No.: US 11,827,422 B2
(45) Date of Patent: Nov. 28, 2023

(54) CAP FOR A CONTAINER, AND METHOD FOR PRODUCING A CAP

(71) Applicant: SACMI COOPERATIVA MECCANICI IMOLA SOCIETA' COOPERATIVA, Imola (IT)

(72) Inventors: Fabrizio Pucci, Castel Guelfo di Bologna (IT); Fiorenzo Parrinello, Medicina (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 340 days.

(21) Appl. No.: 16/979,603

(22) PCT Filed: Mar. 11, 2019

(86) PCT No.: PCT/IB2019/051948
§ 371 (c)(1),
(2) Date: Sep. 10, 2020

(87) PCT Pub. No.: WO2019/175740
PCT Pub. Date: Sep. 19, 2019

(65) Prior Publication Data
US 2021/0039841 A1    Feb. 11, 2021

(30) Foreign Application Priority Data

Mar. 12, 2018  (IT) .................. 102018000003429

(51) Int. Cl.
*B65D 41/48*    (2006.01)
*B65D 41/46*    (2006.01)
(Continued)

(52) U.S. Cl.
CPC .......... *B65D 41/48* (2013.01); *B29D 99/0096* (2013.01); *B65D 41/465* (2013.01); *B65D 55/06* (2013.01); *B65D 2401/30* (2020.05)

(58) Field of Classification Search
CPC ...... B65D 41/48; B65D 41/465; B65D 55/16; B65D 2401/30; B29D 99/0096
(Continued)

(56) References Cited

U.S. PATENT DOCUMENTS 4,790,442 A    12/1988  Gach
4,919,286 A    4/1990   Agbay, Sr.
(Continued)

FOREIGN PATENT DOCUMENTS

CN    1830730    9/2006
EP    0631942    1/1995
(Continued)

*Primary Examiner* — J. Gregory Pickett
*Assistant Examiner* — Niki M Eloshway
(74) *Attorney, Agent, or Firm* — Pearne & Gordon LLP; J. Gregory Chrisman

(57) ABSTRACT

A cap for a container comprises:
a retaining ring suitable for being associated with a neck of the container, the retaining ring extending about an axis;
a closure element for opening or closing an opening defined by the neck of the container;
a hinge structure interposed between the closure element and the retaining ring so as to allow the closure element to be rotated relative to the retaining ring.
The retaining ring and the closure element are separated by a separation line, which extends externally of the hinge structure.
The hinge structure comprises at least one connection band which connects the closure element to the retaining ring, the
(Continued)

connection band being defined inside a recess provided in a side wall of the cap, the side wall extending about said axis.

8 Claims, 15 Drawing Sheets

(51) Int. Cl.
  *B65D 55/16* (2006.01)
  *B29D 99/00* (2010.01)
  *B65D 55/06* (2006.01)
(58) Field of Classification Search
  USPC .................................................. 215/253
  See application file for complete search history.

(56) References Cited

U.S. PATENT DOCUMENTS

| | | |
|---|---|---|
| 5,725,115 A | 3/1998 | Boesl et al. |
| 6,481,588 B1 | 11/2002 | Wagner |
| 8,794,460 B2 | 8/2014 | Druitt et al. |
| 9,969,535 B2 | 5/2018 | Lagler |
| 11,040,806 B2 | 6/2021 | Naumann et al. |
| 2005/0115968 A1 | 6/2005 | Myhre |
| 2006/0163188 A1 | 7/2006 | Lagler |
| 2011/0174760 A1 | 7/2011 | Luzzato et al. |
| 2013/0220967 A1* | 8/2013 | Wang ................ B65D 47/0838 |
| | | 215/253 |
| 2014/0197189 A1 | 7/2014 | Lagler |
| 2020/0377268 A1 | 12/2020 | Naumann et al. |

FOREIGN PATENT DOCUMENTS

| | | | |
|---|---|---|---|
| EP | 1648792 B1 | 4/2006 | |
| KR | 100981240 | 9/2010 | |
| KR | 10132585 B1 * | 11/2013 | |
| RU | 2214956 | 10/2003 | |
| WO | 2011039400 | 4/2011 | |
| WO | WO-2011090278 A2 * | 7/2011 | ......... B65D 41/3447 |
| WO | 2014200165 A1 | 12/2014 | |
| WO | 2019113681 A1 | 6/2019 | |

* cited by examiner

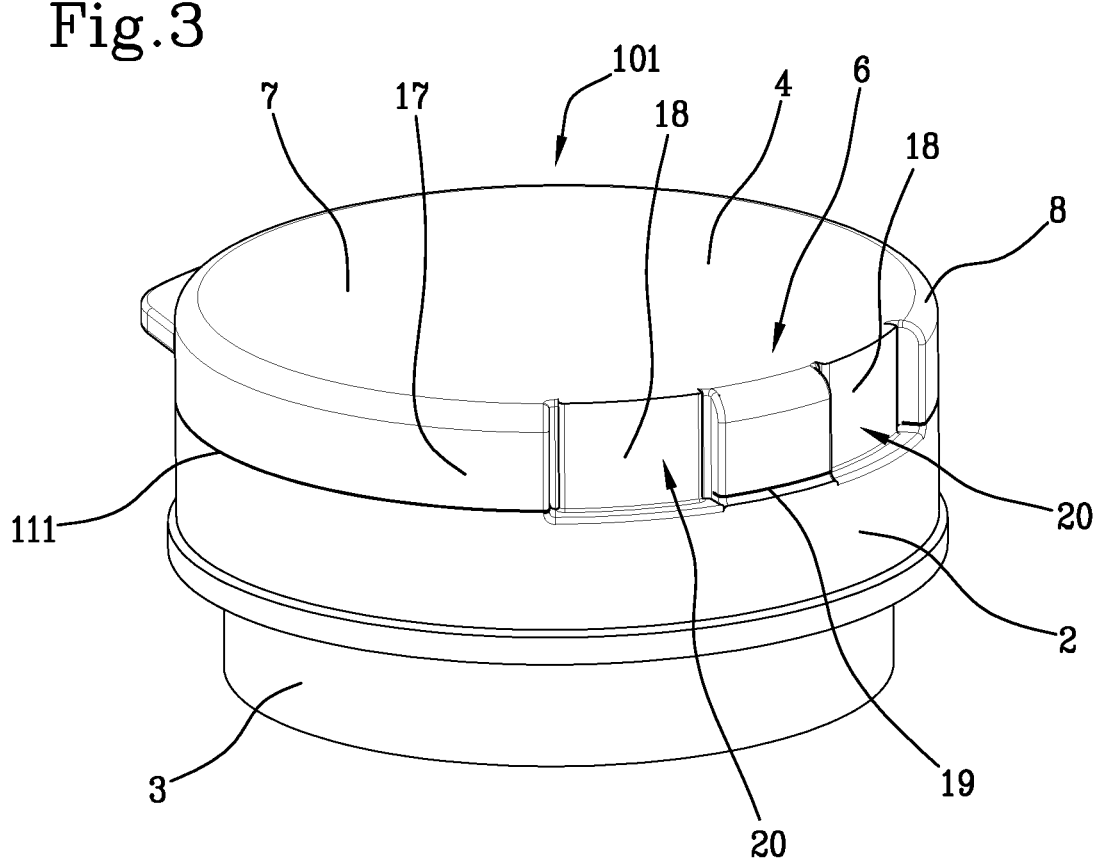

Fig.15
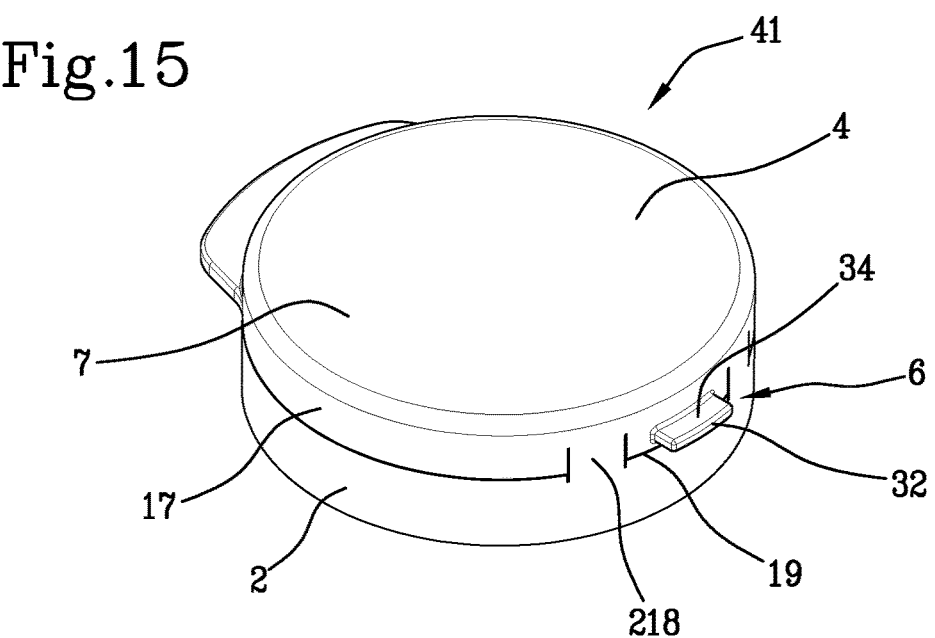
Fig.16
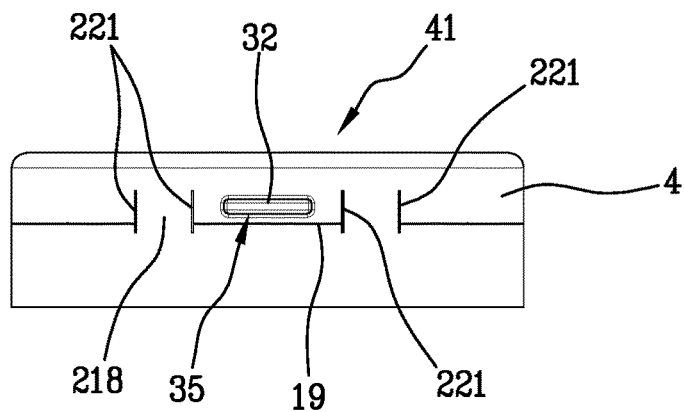
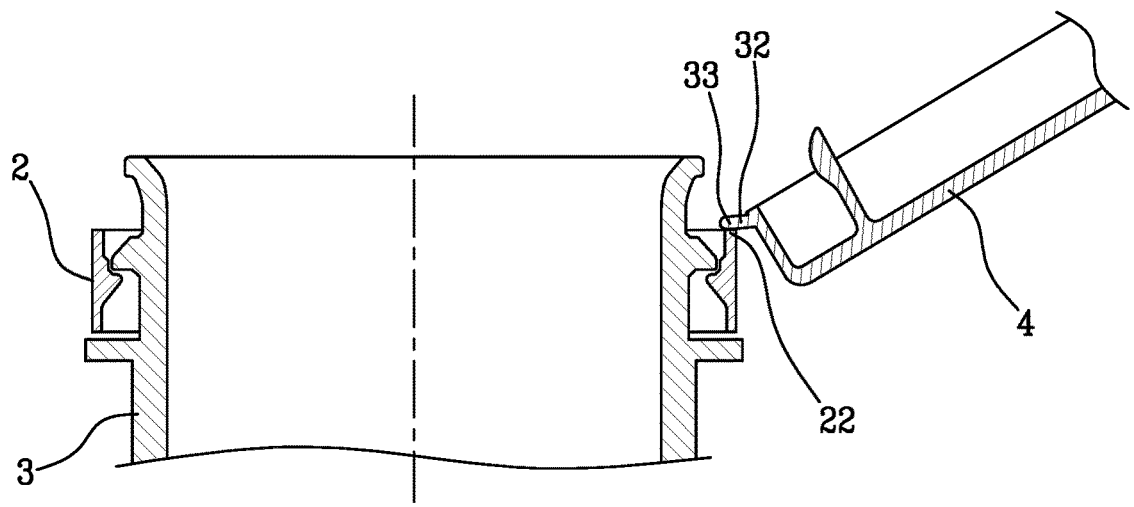
Fig.17

Fig.27
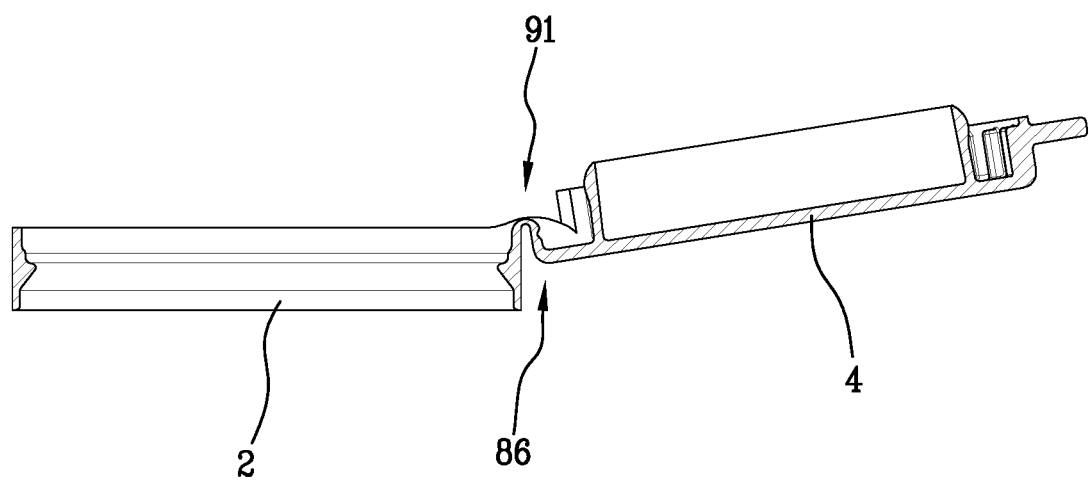
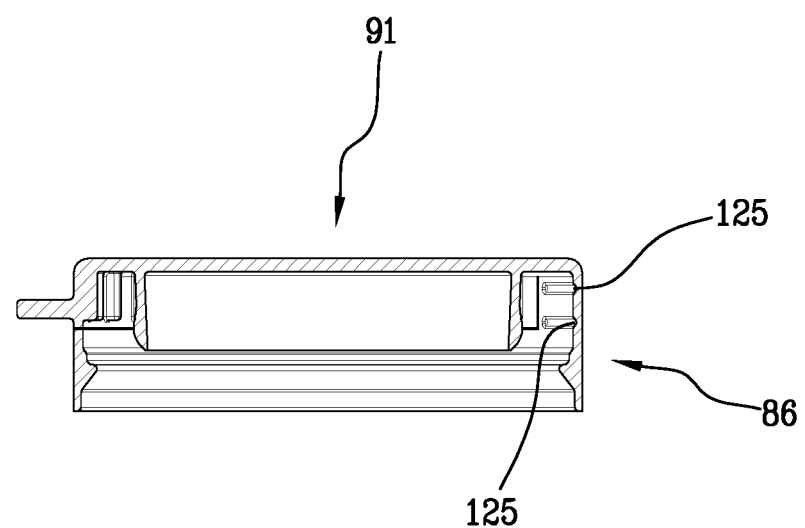
Fig.28

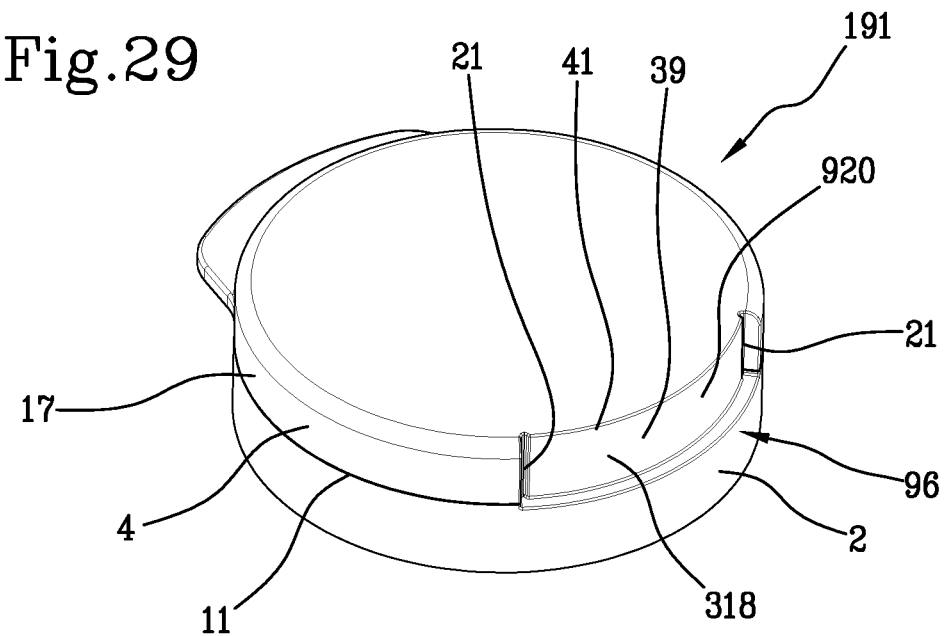
Fig.29
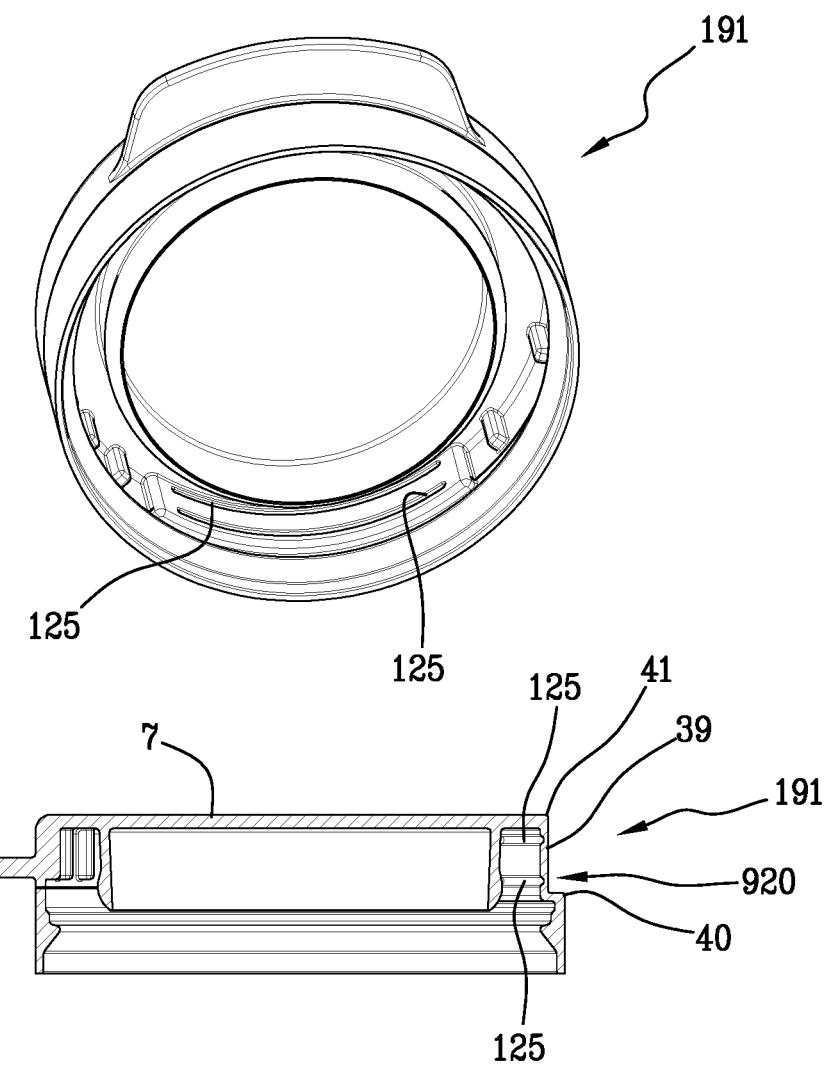
Fig.30
Fig.31

CAP FOR A CONTAINER, AND METHOD FOR PRODUCING A CAP

The invention relates to a cap for a container, particularly a cap provided with a retaining ring, which may be associated with a container neck, the cap being further provided with a closure element hinged to the retaining ring. The cap according to the invention can be of the so-called "snap-on" or "flip top" type, i.e. it can be openable by a snap action, but it can also be an internally threaded cap openable by unscrewing.

The invention further relates to a method for obtaining a cap for a container, particularly of the above-described type.

Caps of the snap-on type are known, these caps comprising a cup-shaped body that is subjected to a cutting operation by means of which a separation line is created which extends circumferentially along a side wall of the cup-shaped body. The separation line defines a retaining ring and a closure element on the cup-shaped body. The retaining ring is intended to be connected to a neck of a container, whilst the closure element is intended to close an opening of the container with which the retaining ring has been associated. The closure element is connected to the retaining ring by means of a hinge defined by the separation line. In fact, the separation line does not extend along the entire circumference of the side wall of the cup-shaped body, but rather leaves intact a circumferential portion of material of the side wall, where the hinge is defined.

Caps of the above-described type have the advantage of being extremely simple to be produced, since the hinge can be obtained by means of a simple cutting operation, without using complicated moulds. However, the performance of the hinge of the above-described caps can be improved. It may indeed occur that, after the closure element has been opened by rotating it around the hinge, the closure element is not able to remain open and closes again prematurely. In this case, if the container is a bottle containing a liquid to be drunk, the closure element can annoyingly hit the nose or mouth of the user.

On the other hand, it may also occur that the closure element remains open, but does not close again correctly because the hinge is not able to guide the closure element into the desired closed position.

Caps of a snap-on type are further known, in which the hinge is directly made in a mould, inside which the cap is produced by means of injection moulding of a polymeric material. Caps of this kind usually have a hinge capable of assuring excellent performance. However, in order to define the hinge, it is necessary to make very thin through slits and/or connecting bridges on the cap, directly in the mould. This implies a considerable complication of the mould, which is very costly as a consequence.

The complication of the mould also derives from the fact that several components of the mould must be movable relative to one another to allow the cap with the hinge to be extracted from the mould.

Furthermore, inside the mould a forming chamber is defined, the forming chamber having a geometry which corresponds to that of the finished cap, that has a rather complicated shape. This makes it more difficult for the polymeric material, in a molten state, to fill the forming chamber, and moreover results in a worsening of the cooling of the cap in the mould. Consequently, there is an increase in the cycle time, i.e. the time necessary to form a cap.

An object of the invention is to improve the caps provided with a hinge, particularly, but not exclusively, caps having a snap-on or internally threaded closure element.

A further object is to provide a cap having a closure element connected to a retaining ring by means of a hinge, wherein the hinge ensures good performance.

A further object is to provide a cap having a closure element connected to a retaining ring by means of a hinge, wherein the closure element remains in a stable position after being opened, without closing again prematurely and hitting the user's mouth or nose.

A further object is to provide a cap having a closure element connected to a retaining ring by means of a hinge which can be produced in a relatively easy manner.

In a first aspect of the invention, there is provided a cap for a container, comprising:
  a retaining ring suitable for being associated with a neck of the container, said retaining ring extending about an axis;
  a closure element for opening or closing an opening defined by the neck of the container;
  a hinge structure interposed between the closure element and the retaining ring for allowing the closure element to be rotated relative to the retaining ring;
  wherein the hinge structure comprises at least two connection bands that connect the closure element to the retaining ring, a cutting line being interposed between said at least two connection bands, the cutting line extending transversely, in particular perpendicularly, to the axis.

By providing at least two connection bands, rather than a single connection band as was the case in the prior art, it is possible to obtain a hinge structure having high stability, which is capable of avoiding, or significantly limiting, lateral displacements of the closure element. This enables the closure element to be maintained guided while it is being closed, so that at the end of a closure movement, the closure element is positioned correctly relative to the neck of the container.

The cutting line interposed between the connection bands enables the rigidity of the hinge structure to be maintained within acceptable levels. Furthermore, by selecting the length and the position of the cutting line it is possible to modify the behaviour of the hinge structure so as to adapt it to the requirements of the cap/container neck combination considered, as well as to the requirements of the different polymeric materials that can be used to produce the cap.

This enables an extremely cap versatile to be obtained.

Furthermore, after the closure element has been moved into an open position, the cutting line interposed between the connection bands can help to prevent the closure element from closing again prematurely, i.e. it can help to keep the closure element open. This occurs because, in the open position, the closure element interferes with the retaining ring at the cutting line, which makes it unlikely that the closure element can close on its own, without the user's intervention.

In an embodiment, the hinge structure is configured so as to keep the closure element stably in an open position, thereby preventing the closure element from accidentally closing.

The hinge structure can be further configured to generate a vibration, when the closure element is moved from a closed position to an open position and/or from an open position to a closed position.

The vibration can be simply perceivable by the hands of the user who is handling the cap, for example as a discontinuity in the movement of the closure element that is about to be brought into the open position or into the closed position.

Alternatively, the vibration can be accompanied by a sound like a "click", perceivable also audibly by the user.

The hinge structure can be configured to keep the closure element in the open position owing to interference between:
- a first edge of the closure element or of the retaining ring defined by the cutting line, and
- a second edge cooperating with the first edge.

When the closure element is moved from the closed position to the open position (or vice versa), an interference occurs between the first edge and the second edge. This interference gradually increases until reaching a maximum value in an intermediate position between the closed position and the open position. If, after reaching this intermediate position in which the interference is at a maximum, the user continues to move the closure element towards the open position, the first edge and the second edge will snap beyond the position of maximum interference, thereby reaching the open position and possibly producing a vibration. At this point, the closure element can be brought back into the closed position only after the first edge and the second edge have been made to snap beyond the position of maximum interference again, in a direction of rotation directed from the open position to the closed position. This is substantially impossible without the user's intervention, which allows the closure element to be kept in the open position as long as the user wishes. Furthermore, the vibration may be pleasing to the user, who thus receives confirmation that the closure element is being opened (or closed) correctly.

In an embodiment, the first edge and the second edge that interfere with each other to keep the closure element in the open position are edges of the cutting line facing each other.

In particular, the first edge delimits the closure element along the cutting line, whereas the second edge delimits the retaining ring along the cutting line.

In an alternative embodiment, the first edge delimits the closure element along the cutting line, whereas the second edge delimits an upper portion of the container neck with which the closure element is intended to be associated.

In a further alternative embodiment, the first edge is formed on a projection that projects outwards from the closure element, in a position interposed between the connection bands, whereas the second edge delimits the retaining ring along the cutting line.

Each of these three embodiments enables the vibration to be produced in a manner that is clearly perceivable by the user.

The cutting line can be conformed as a slit passing through the entire thickness of the material forming the cap.

The cutting line can be obtained by means of a cutting operation, carried out after the cap has already been formed.

This enables a mould in which the cap is produced to be simplified, as it is not necessary to provide, in the mould, any element allowing the cutting line to be formed.

The cutting line can extend, in particular continuously, from one connection band to the other connection band.

In an embodiment, each connection band is laterally delimited by at least one delimitation line, or more specifically by two delimitation lines, which can be parallel to each other.

In particular, the delimitation lines can extend parallel to the axis about which the retaining ring extends.

The delimitation lines enable the connection bands to be isolated from the neighbouring zones of the cap so that, during use, the connection bands are able to bend and deform, while limiting the deformations of the neighbouring zones of the cap. This ensures proper functioning of the hinge structure.

In an embodiment, the delimitation lines can be conformed as slits passing through the entire thickness of the material forming the cap.

In this case, the delimitation lines can be produced by means of a cutting operation carried out after the cap has been formed. This enables a mould in which the cap is produced to be simplified, because the mould does not need to be provided with any particular forming elements in order to create the delimitation lines.

It is also possible, even though this may complicate the structure of the mould to some extent, to obtain delimitation lines conformed as through slits directly in the mould.

In an alternative embodiment, the delimitation lines can be conformed as weakening lines having a reduced thickness compared to the neighbouring zones of the cap, i.e. as weakening lines that do not pass through the thickness of the cap.

In other words, the delimitation lines can be defined by thin membranes that weaken the cap, without however compromising the material continuity thereof. The embodiment in which the delimitation lines delimiting the connection bands are conformed as weakening lines having a reduced thickness compared to the neighbouring zones, enables a cap having a good behaviour from a hygienic point of view to be obtained. This is because foreign bodies cannot pass through delimitation lines conformed as weakening lines. The risk of contaminations or pollution of the neck of the container closed off by the cap before the latter is opened for the first time is thus greatly reduced.

A similar advantage can be found also if the delimitation lines are obtained by means of a cutting operation performed with a thin blade, because in this case the mutually facing edges of the delimitation lines are substantially in contact with each other and do not allow entry of foreign bodies.

In an embodiment, each connection band is defined in a recess that penetrates towards the inside of the cap.

The closure element can comprise a transverse wall that extends transversely, in particular perpendicularly, to the axis about which the retaining ring extends. Each recess inside which a connection band is defined can extend up to the transverse wall of the closure element.

This embodiment is particularly suitable in the case where the recesses in which the connection bands are defined are formed inside a mould while forming of the cap.

In fact, if the recesses extend up to the transverse wall of the closure element, it will be particularly easy to extract the cap from the mould. This is because undercuts are avoided. The undercuts would require additional movements of the mould components in order to allow the formed cap to be removed.

In an embodiment, the retaining ring and the closure element are separated by a separation line that extends externally of the hinge structure. When the closure element passes from a closed position to an open position, the closure element moves away from the retaining ring along the separation line.

The separation line can extend on a plane arranged transversely, in particular perpendicularly, to the axis about which the retaining ring extends.

The cutting line provided in the hinge structure can be arranged on the same level as the separation line.

Alternatively, the cutting line of the hinge structure can be positioned above (i.e. in the closure element) or below (i.e. in the retaining ring) the separation line.

By appropriately choosing the position of the cutting line, it is possible to design the hinge structure in such a way as to render it suitable for the particular application considered.

Along the separation line there can be a plurality of breakable bridges, suitable for being broken the first time the closure element is opened.

Owing to the breakable bridges, the consumer can easily verify whether the container has already been opened or whether the cap is still intact.

In an embodiment, the separation line is in the form of a score line that passes partially, but not totally, through the thickness of the cap.

The score line leaves intact a thin membrane having a reduced thickness compared to the neighbouring zones of the cap. This thin membrane joins the retaining ring and the closure element before they are separated for the first time. Owing to the score line, it is possible to prevent entry of polluting substances that could compromise the hygiene of the neck.

The score line can be obtained by means of a cutting operation, which only partially affects the thickness of the cap, performed after the cap has already been formed.

When the cap is opened for the first time, the closure element is moved away from the retaining ring, thereby breaking the membrane provided along the score line.

The consumer can easily verify that the cap has never been opened by checking whether the membrane arranged along the score line is still intact.

In a second aspect of the invention, there is provided a method for producing a cap for a container, wherein the cap comprises:
- a retaining ring suitable for being associated with a neck of the container;
- a closure element hinged to the retaining ring for opening or closing an opening defined by the neck of the container;

and wherein the method comprises the steps of:
- providing a cup-shaped body having a side wall extending about an axis and an end wall extending transversely to the axis;
- cutting the side wall along a separation line for defining the retaining ring and the closure element, wherein during the cutting step there is provided interacting with the material forming the side wall along a circumferential extension of the side wall about the axis, said circumferential extension being less than 360°, so as to leave intact at least one connection band which connects the retaining ring to the closure element;
- making at least one delimitation line which laterally delimits the connection band, the delimitation line extending transversely, in particular perpendicularly, to the end wall.

Owing to the second aspect of the invention, it is possible to produce, in a relatively simple manner, a cap comprising a retaining ring and a closure element connected to the retaining ring by means of a hinge structure, wherein the hinge structure is capable of providing good performance.

In fact, the hinge structure comprises at least one connection band that remains defined on the cup-shaped body after the side wall has been cut along a separation line having a circumferential extension that is less than 360°. Since the connection band is defined, along the separation line, by means of a cutting operation, it is possible to simplify the manner of obtaining the connection band. Furthermore, since the connection band is laterally delimited by at least one delimitation line, it is possible to render the connection band independent from the neighbouring material, i.e. to isolate the connection band from the neighbouring zones of the cap, so that the connection band is free to bend or deform without being excessively influenced by the behaviour of the neighbouring zones of the cap. This enables a good performance of the hinge structure to be obtained.

The step of providing the cup-shaped body can comprise a moulding step during which the cup-shaped body is formed, particularly by compression moulding or by injection moulding.

The at least one delimitation line which laterally delimits the connection band can be obtained during the moulding step through which the cup-shaped body is formed, i.e. inside a mould in which the cup-shaped body is shaped.

In this case, the at least one delimitation line can be in the form of a weakening line having a reduced thickness compared to the neighbouring zones of the cap, or in the form of a slit passing through the entire thickness of the side wall of the cup-shaped body.

If the at least one delimitation line is in the form of a weakening line having a reduced thickness, it is possible to obtain a cap having good hermetic properties, i.e. in which the risks of the neck of the container closed by the cap being contaminated, for example by insects or other solid particles, before the container is opened, are greatly reduced.

In an alternative embodiment, the at least one delimitation line can be obtained by means of a cutting operation after the step of providing the cup-shaped body.

In this case, the at least one delimitation line can be in the form of a cut passing through the entire thickness of the material of the cap.

By producing the at least one delimitation line by means of a cutting operation, it is possible to further simplify the method for obtaining the cap, since it is not necessary to provide a mould having movable parts which enable the at least one delimitation line to be obtained.

Furthermore, even if at least one delimitation line is conformed as a through cut, it is possible, to a large extent, to avoid contaminations of the neck of the container closed by the cap. This is due to the fact that the edges of the through cut are substantially in contact with each other and are able to prevent foreign bodies from penetrating into the container.

In an embodiment, the connection band is defined at a portion of the side wall of the cup-shaped body which has a thickness that is substantially equal to the thickness of the further portion of the side wall of the cup-shaped body along which the separation line is defined.

In this manner, there is no need to provide for complicated variations in thickness in the part of the side wall of the cup-shaped body intended to form the separation line and the connection band.

In a third aspect of the invention, there is provided a cap for a container, comprising:
- a retaining ring suitable for being associated with a neck of the container, said retaining ring extending about an axis;
- a closure element for opening or closing an opening defined by the neck of the container;
- a hinge structure interposed between the closure element and the retaining ring for allowing the closure element to be rotated relative to the retaining ring between a closed position and an open position;

wherein the hinge structure comprises a connection band which connects the closure element to the retaining ring, the connection band having a projecting part which projects towards the outside of the cap in the closed position, the projecting part being deformable so as to bend towards the inside of the cap when the closure element is rotated towards the open position.

In the cap according to the third aspect of the invention, the closure element is capable of remaining stably in the open position, without closing prematurely. In fact the projecting part, by bending towards the inside when the closure element is rotated into the open position, creates an obstacle to closing the cap. In order to bring the closure element back into the closed position, it is necessary for the user to apply a minimum force, which makes it difficult for the cap to close without external interventions.

Furthermore, when the projecting part, which initially projected towards the outside of the cap, bends towards the inside, or vice versa, it can generate a vibration perceivable by the user, possibly accompanied by a sound like a "click". This allows the user to have the certainty that the closure element has passed from the closed position to the open position, or vice versa, even before visually checking the position of the closure element. This is generally appreciated by the user.

In a fourth aspect of the invention, there is provided a cap for a container, comprising:
 a retaining ring suitable for being associated with a neck of the container, said retaining ring extending about an axis;
 a closure element for opening or closing an opening defined by the neck of the container;
 a hinge structure interposed between the closure element and the retaining ring for allowing the closure element to be rotated relative to the retaining ring between a closed position and an open position;
 wherein the hinge structure comprises a connection band which connects the closure element to the retaining ring, the connection band having at least two weakening lines arranged transversely to said axis, said at least two weakening lines defining respective sequential lines of rotation about which the closure element is configured to rotate, in sequence, when passing from the closed position to the open position or vice versa.

When the closure element passes from the closed position to the open position, the closure element first rotates about a weakening line, thereby reaching an intermediate position in which the other weakening line is substantially undisturbed. Subsequently, the closure element rotates about the other weakening line, substantially without rotating further about the weakening line about which the previous rotation took place. The open position is thus reached. The opposite occurs when the closure element passes from the open position to the closed position.

The intermediate position is a stable position from which the closure element cannot be moved away, unless a minimum force is applied. This makes it difficult to inadvertently close the closure element once it has reached the intermediate position.

The open position, into which the closure element has been brought after rotating, sequentially, about both weakening lines, is also a stable position, from which the closure element can be closed again only by applying a minimum force. It is therefore extremely unlikely, if not impossible, that the closure element will close spontaneously without the intended intervention of the user.

In an embodiment, the closure element is configured to generate two successive vibrations, corresponding respectively to the initial rotation about a weakening line and to the subsequent rotation about the other weakening line. The two successive vibrations enable the user to become immediately aware of the position reached by the closure element.

In a fifth aspect of the invention, there is provided a cap for a container, comprising:
 a retaining ring suitable for being associated with a neck of the container, said retaining ring extending about an axis;
 a closure element for opening or closing an opening defined by the neck of the container;
 a hinge structure interposed between the closure element and the retaining ring for allowing the closure element to be rotated relative to the retaining ring between an open position and a closed position;
 wherein the closure element comprises a transverse wall and an annular side wall connected to the transverse wall, the annular side wall being internally provided with one or more hooking elements suitable for engaging with the neck of the container in order to keep the closure element in the closed position. Owing to the fifth aspect of the invention, the closure element can be kept stably in the closed position even if a relatively high internal pressure builds up inside the container closed by the cap, for example because the container has been squeezed. This prevents the cap from opening as a result of the internal pressure and also prevents the substance present inside the container from spilling out into the surrounding environment in an undesirable way, spreading for example in the bag of a user.

In an embodiment, on an inner surface of the annular side wall there is provided a plurality of ribs, each of which is associated with a hooking element.

The hooking element can be in the form of a hook that projects from the corresponding rib, in particular at an end of the rib farther from the transverse wall.

In the closed position of the closure element, each hooking element engages with the neck of the container in such a way that the closure element can be brought into the open position only after the hooking elements have been deformed so as to disengage them from the neck of the container.

In an embodiment, the hooking elements are so conformed as to engage with a protruding part of the neck of the container, for example with an edge portion of the neck that protrudes outward.

In an embodiment, said one or more hooking elements comprise at least one flap that projects from an inner surface of the annular side wall and is folded towards the transverse wall.

Said one or more hooking elements make it more difficult, if not impossible, to accidentally opening the cap according to the fifth aspect of the invention.

In a sixth aspect of the invention, there is provided a cap for a container, comprising:
 a retaining ring suitable for being associated with a neck of the container, the retaining ring extending about an axis;
 a closure element for opening or closing an opening defined by the neck of the container;
 a hinge structure interposed between the closure element and the retaining ring for allowing the closure element to be rotated relative to the retaining ring;
 wherein the retaining ring and the closure element are separated by a separation line, which extends externally of the hinge structure, and wherein the hinge structure comprises at least one connection band which connects the closure element to the retaining ring, the connection band being defined inside a recess provided in a side wall of the cap, the side wall extending about said axis.

The cap according to the sixth aspect of the invention is particularly easy to be manufactured. In particular, the recess enables the separation line to be obtained by means of a cutting operation without interfering with the connection band, even if the cutting operation is carried out over the entire angular extension of the side wall about the axis.

The invention can be better understood and carried out with reference to the attached drawings, which illustrate some embodiments thereof by way of non-limiting example, wherein:

FIG. 3 is a perspective view of a cap according to an alternative embodiment, fastened to a neck of a container;

FIG. 4 is an interrupted perspective view showing a hinge structure of the cap of FIG. 3;

FIG. 15 is a perspective view showing a cap according to an alternative embodiment;

FIG. 16 is a side view from behind of the cap of FIG. 15;

FIG. 17 is a schematic, interrupted sectional view showing how the cap of FIG. 15 can be kept stably in the open position;

FIG. 27 is a sectional view showing the cap of FIG. 25 in an open position;

FIG. 28 is a sectional view like the one in FIG. 27, showing the cap of FIG. 25 in a closed position;

FIG. 29 is a perspective view showing a cap according to a further alternative embodiment;

FIG. 30 is a perspective view showing the inside of the cap of FIG. 29;

FIG. 31 is a sectional view showing the cap of FIG. 29 in a closed position;

FIGS. 1 and 2 show a cap 1 for a container, for example a bottle, which can be opened or closed again by a user.

Figure 1:
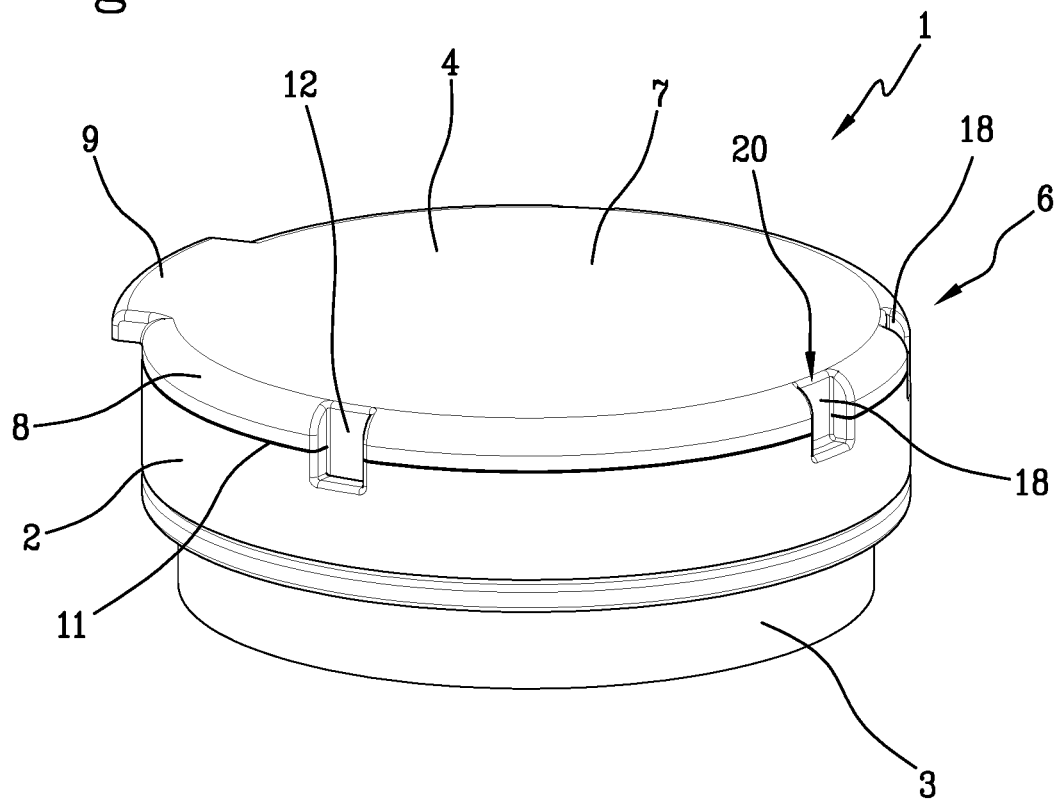
FIG. 1 is a perspective view of a cap, fastened to a neck of a container.

The cap 1 comprises a retaining ring 2, suitable for being fixed to a neck 3 of the container closed by the cap 1 in order to retain the cap 1 on the neck 3. The retaining ring 2 extends about an axis Z, which may be seen in FIG. 2. The cap 1 further comprises a closure element 4, movable between a closed position shown in FIGS. 1 and 2 and an open position, not illustrated, in order to close or alternatively open an opening 5 defined by the neck 3 of the container.

The closure element 4 is hinged to the retaining ring 2, i.e. it is fixed to the retaining ring 2 by means of a hinge structure 6 that will be described in detail below.

The closure element 4 is thus movable between the open position and the closed position substantially by means of a movement of rotation, about a hinge axis that can be perpendicular to the axis Z.

The closure element 4 comprises a transverse wall 7, which can be substantially flat. The transverse wall 7 extends transversely, in particular perpendicularly, to the axis Z.

The closure element 4 is further provided with a connecting portion 8, interposed between the transverse wall 7 and the retaining ring 2. In the example illustrated, the connecting portion 8 is in the form of a rounded connection zone having an annular geometry.

A protrusion 9 can project from the closure element 4, in particular from the connecting portion 8, in a position that is diametrically opposite the hinge structure 6, in order to make easier opening the cap 1. In fact, when a user wishes to bring the closure element 4 into the open position, he can position a finger underneath the protrusion 9 so as to rotate the closure element 4 about the hinge axis more easily.

Figure 2:
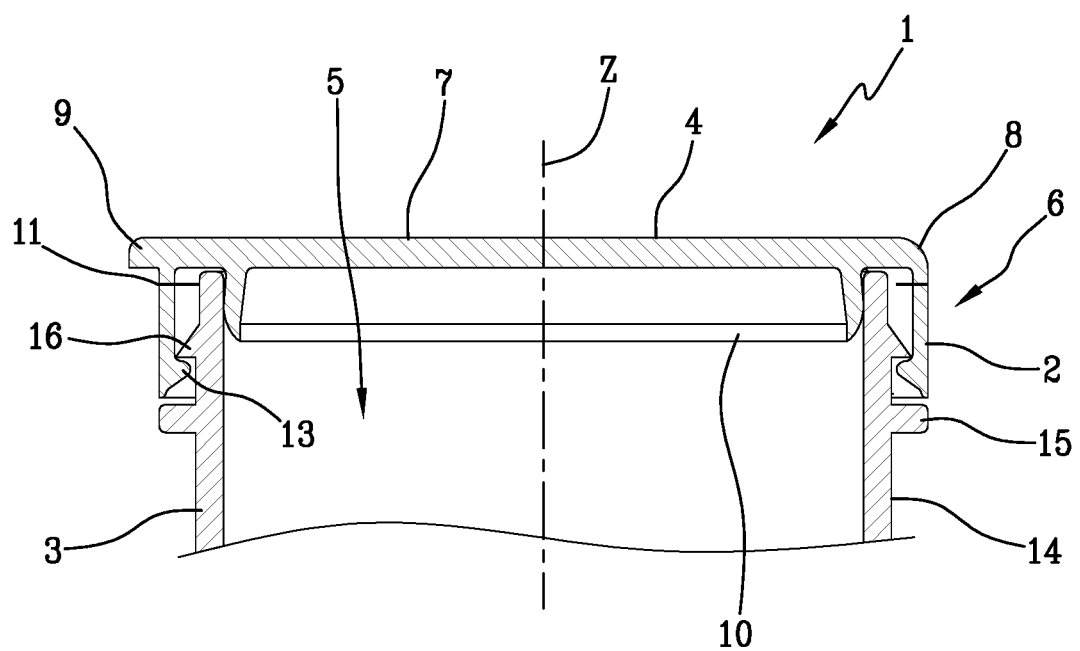
FIG. 2 is a cross section, taken along a vertical plane passing through a hinge structure, of the cap and the hinge neck of FIG. 1.

A sealing lip 10, shown in FIG. 2, can project from the surface of the transverse wall 7 facing towards the inside of the cap 1. The sealing lip 10, having for example an annular shape, is suitable for engaging with an inner surface of the neck 3 to prevent leakage of the substance contained in the container, or to prevent contaminations of said substance with external substances.

In the closed position, between the closure element 4 and the retaining ring 2, there is defined a separation line 11, along which the closure element 4 is separated from the retaining ring 2.

The separation line 11 can extend on a plane positioned transversely, in particular perpendicularly, to the axis Z.

The separation line 11 has a circumferential extension about the axis Z that is less than 360°, because the closure element 4 is joined to the retaining ring 2 at least along the hinge structure 6, as will be better described below.

A plurality of breakable bridges, not shown in FIGS. 1 and 2, can be provided along the separation line 11, said breakable bridges being suitable for being broken the first time the closure element 4 is brought into the open position, so as to indicate to the user whether the container closed by the cap 1 has ever been opened.

The separation line 11 can be interrupted at an opening indicator element 12, which may be seen in FIG. 1. The opening indicator element 12 is in the form of a strip of material that joins the closure element 4 to the retaining ring 2. The opening indicator element 12 can be obtained inside a recess made in part in the retaining ring 2 and in part in the closure element 4.

The opening indicator element 12 acts as a tampering indicator to warn a user in a very evident manner as to whether the container closed by the cap 1 has already been opened. If this is the case, the opening indicator element 12 will be torn, and this will be immediately evident, much more evident than with the breakable bridges distributed along the separation line 11.

In the example illustrated, the retaining ring 2 is conformed as a substantially cylindrical ring, from an inner surface of which a circumferential protuberance 13 can project, as may be seen in FIG. 2.

The circumferential protuberance 13 can in particular be arranged near an end of the retaining ring 2 that is farther from the separation line 11. The circumferential protuberance 13 is suitable for engaging with the neck 3 of the container, as will be better described below.

In the example shown in FIG. 2, the neck 3 comprises a substantially cylindrical portion 14, extending about the axis Z, from which an annular bead 15 projects, towards the outside of the neck 3. The annular bead 15 can have a square or rectangular cross section. The annular bead 15 works as a stop element, preventing the retaining ring 2 from descending along the neck 3 below a desired level.

Above the annular bead 15, the neck 3 is provided with a circular projection 16, which projects circumferentially towards the outside of the neck 3. The circular projection 16 can have a substantially triangular cross section.

When the cap 1 is applied on the neck 3, the circumferential protuberance 13 of the retaining ring 2 is arranged below the circular projection 16, and in particular it is interposed between the circular projection 16 and the annular bead 15. If the user now applies to the closure element 4 a force having a direction such as to bring the closure element into the open position, the retaining ring 2, which is still joined to the closure element 4 by the breakable bridges and the opening indicator element 12, is moved upwards together with the closure element 4. At a certain point, the circumferential protuberance 13 of the retaining ring 2 abuts against the circular projection 16 of the neck 3. From this moment on, the retaining ring 2 is no longer be able to move upwards. If the user continues to exert a force directed upward on the closure element 4, the opening indicator element 12 and any breakable bridges are subjected to a tensile stress that will cause them to break. The closure element 4 can now be brought into the open position owing to the hinge structure 6.

The hinge structure 6 will be described in greater detail below with reference to FIGS. 3 and 4.

FIGS. 3 and 4 show a cap 101 that has numerous similarities to the cap 1 shown in FIGS. 1 and 2. The parts of the cap 101 in common with those of the cap 1 are indicated with the same reference numbers previously used in FIGS. 1 and 2 and will not be described again in detail.

The main difference between the cap 101 shown in FIGS. 3 and 4 and the cap 1 shown in FIGS. 1 and 2 is that the cap 101 is provided with a separation line 111, which separates the retaining ring 2 from the closure element 4, arranged in a lower position (i.e. in a position that is farther from the transverse wall 7) than the separation line 11 of the cap 1. Consequently, the closure element 4 of the cap 101 comprises a skirt 17 that extends from the connecting portion 8 towards the separation line 111. The skirt 17 has a substantially cylindrical geometry.

The hinge structure 6 of the cap 101 shown in FIGS. 3 and 4 is similar to the hinge structure 6 of the cap 1 shown in FIGS. 1 and 2. In particular, the hinge structure 6 comprises a pair of connection bands 18, arranged for connecting the retaining ring 2 to the closure element 4. The connection bands 18 enable the closure element 4 to be kept joined to the retaining ring 2 also when the closure element 4 is in the open position.

Each connection band 18 can be conformed as a flat band, or a cylinder segment.

Interposed between the connection bands 18 there is a cutting line 19 that extends transversely, in particular perpendicularly, to the axis Z.

In the example shown in FIGS. 3 and 4, the cutting line 19 is at the same level as the separation line 111. This condition is not necessary, however, as the cutting line 19 could also be positioned upwards or downwards in relation to the separation line 111.

The cutting line 19 can be conformed as a cut passing through the thickness of the cap 1.

The cutting line 19 can extend from one connection band 18 to the other connection band 18.

In the example of FIGS. 3 and 4, each connection band 18 is obtained inside a recess 20 made in a side wall of the cap 101. The recess 20 projects towards the inside of the cap 101. In the example illustrated, the recess 20 extends almost entirely in the closure element 4, and extends in particular in the connecting portion 8 and in the skirt 17.

However, this condition is not necessary.

Each recess 20 can also extend in part in the retaining ring 2 and in part in the closure element 4, as in the embodiment of FIGS. 1 and 2.

Each recess 20 can extend up to the transverse wall 7 of the closure element 4.

Each connection band 18 is delimited at the sides thereof by a pair of delimitation lines 21, which circumferentially delimit the respective connection band 18. In other words, the delimitation lines 21 isolate the connection band 18 from the neighbouring material of the cap 1.

Each connection band 18 is thus interposed between two delimitation lines 21. The delimitation lines 21 extend transversely, in particular perpendicularly, to the cutting line 19.

The delimitation lines 21 that delimit a connection band 18 can in particular be parallel to each other and parallel to the axis Z.

In the example illustrated, the delimitation lines 21 are conformed as slits passing through the thickness of the cap 101. This condition is not necessary, however, because, as will be better described below, the delimitation lines 21 could also be conformed as weakening lines that do not pass through the entire thickness of the cap 101.

In the example illustrated, the delimitation lines 21 extend up to the transverse wall 7 of the closure element 4.

The delimitation lines 21 can extend for the entire length, in an axial direction, of the corresponding connection band 18.

In the example of FIGS. 3 and 4, each delimitation line 21 extends from the separation line 111 up to the transverse wall 7.

More in general, the delimitation lines 21 have a length, i.e. a dimension measured parallel to the axis Z, which is relatively accentuated. This makes it possible to obtain relatively long connection bands 18, which, when the closure element 4 is brought into an open position, easily deform in an elastic manner without yielding excessively.

The delimitation lines 21 can be defined inside the recess 20 in which the corresponding connection band 18 is formed.

The cutting line 19 can extend between two consecutive delimitation lines 21. Naturally, the cutting line 19 extends between two delimitation lines 21 which delimit two adjacent connection bands 18.

The cutting line 19 is defined by a lower edge 22 and an upper edge 23, shown in FIG. 4. The adjectives "lower" and "upper" are to be understood here as referring to the position that the cap 101 has when it is applied on the corresponding container. The upper edge 23 is therefore the edge of the cutting line 19 that is closer to the transverse wall 7, whereas the lower edge 22 is the edge of the cutting line 19 that is farther from the transverse wall 7.

In FIG. 4, a plurality of breakable bridges 24 arranged along the separation line 111 may also be seen.

When the user, starting from the closed position of the closure element 4, applies to the closure element 5 a force having a direction such as to move the closure element 4 away from the retaining ring 2, the closure element 4 rotates about the hinge structure 6. The connection bands 18 deform, bending backwards, i.e. towards the outside of the cap, and allow the closure element 4 to be moved away from the retaining ring 2 along the separation line 111, until reaching the open position.

Depending on the geometry of the cap, and more in general of the hinge structure 6, the connection bands 18 can deform elastically so as to go back into their initial configuration when the closure element 4 is brought back into its closed position.

It is also possible that the connection bands 18 may yield while the cap is opened, i.e. deform permanently at least in part.

In an embodiment, the hinge structure 6 is configured so as to keep the closure element 4 stably in an open position.

It is also possible for the hinge structure 6 to be configured to produce a vibration when the closure element 4 is moved from the open position to the closed position, or vice versa.

The vibration can be perceived by the hand of the user who is moving the closure element 4, as a discontinuity in the movement of the closure element 4. This discontinuity is due to an increase in the force that the user must apply in order to go beyond a position of maximum interference and continue to move the closure element 4, as will be better described below.

It is also possible, but not necessary, that the vibration is accompanied by a sound like a "click", perceptible by the user's ear.

For example, when the closure element 4 is moved from the closed position towards the open position, and the connection bands 18 deform correspondingly, the upper edge 23 of the cutting line 19 will rotate relative to the lower edge 22. Between the upper edge 23 and the lower edge 22 there can be a mechanical interference which increases gradually until reaching a position of maximum interference interposed between the closed position and the open position.

Figure 13:
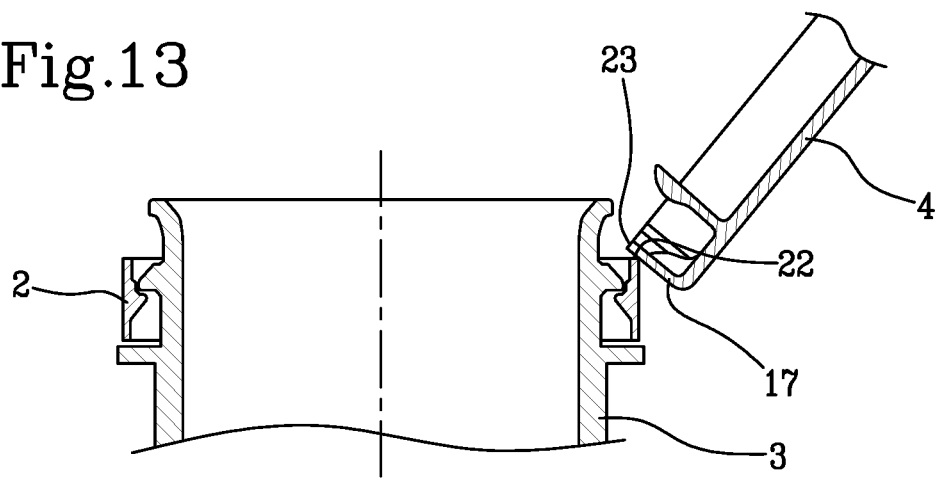
FIG. 13 is a schematic, interrupted sectional view showing a first way in which a closure element can be kept stably in an open position.

If the user continues to move the closure element 4 beyond the position of maximum interference, as shown in FIG. 13, the upper edge 23 will snap beyond the lower edge 22, thereby reaching an open position that can be defined as a stable position. In fact, the closure element 4 will tend to remain in the open position, without closing again spontaneously.

It is also possible that, when the position of maximum interference is passed, the use perceives a vibration, possibly accompanied by a sound, for example like a "click".

The opposite occurs when the closure element 4 is moved into the closed position starting from the open position. In this case as well, a vibration perceivable by the user can be generated.

In the open position of the closure element 4 shown in FIG. 13, near the cutting line 19, the skirt 17 engages with the lower edge 22 of the cutting line 19. In other words, along the cutting line 19, the skirt 17 is practically wedged against the lower edge 22 of the cutting line 19. This enables the closure element 4 to be kept stably in the open position.

In other words, the closure element 4 is kept stably in the open position owing to the interference between the closure element 4 and the retaining ring 2, particularly between the closure element 4 and the lower edge 22 of the cutting line 19.

Figure 14:
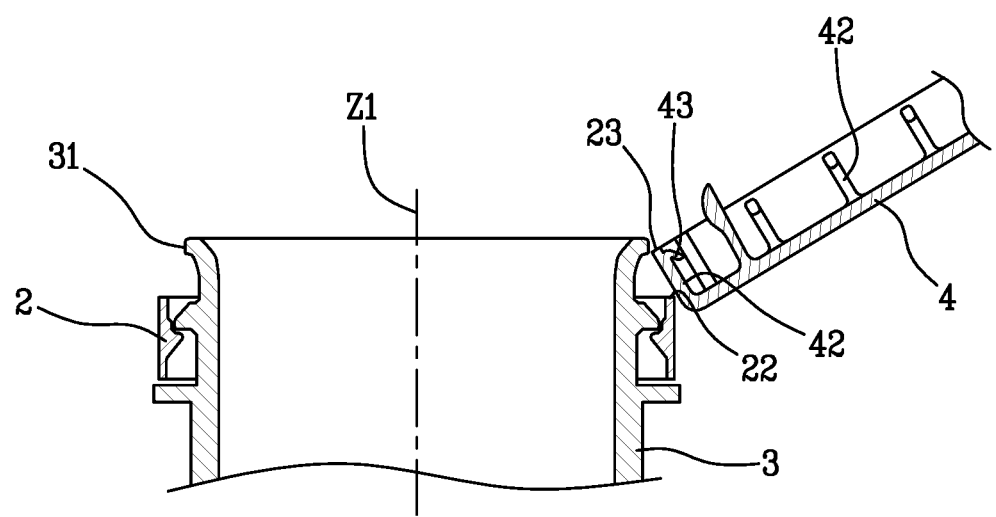
FIG. 14 is a view like the one in FIG. 13, referring to an alternative way of keeping the closure element in the open position.

Alternatively, as shown in FIG. 14, the closure element 4 can be kept stably in the open position due to interference that is generated between the closure element 4 and an edge portion 31 of the neck 3.

In the example shown in FIG. 14, the edge portion 31 has a flared conformation, i.e. it widens slightly outwards relative to a longitudinal axis Z1 about which the neck 3 extends. However, the edge portion 31 could also have other geometric conformations.

When the closure element 4, starting from the closed position, is rotated towards the open position, the upper edge 23 of the cutting line 19 moves away from the corresponding lower edge 22 it was originally facing. The upper edge 23 simultaneously moves nearer to the edge portion 31 of the neck 3, until coming into contact with the edge portion 31 and mechanically interfering with it. The interference between the upper edge 23 and the edge portion 31 gradually increases until reaching a position of maximum interference. In order to continue rotating the closure element 4, the user must increase the force applied to the closure element 4, until the latter passes beyond the position of maximum interference, thus reaching the open position. The opposite situation occurs when the closure element 4 is brought back into the closed position.

The closure element 4 is further able to remain stably in the open position. In this position, the upper edge 23 of the cutting line 19, which interferes with the edge portion 31 of the neck 3, prevents the closure element 4 from going back into the closed position without the user's intervention.

It is possible that, at the moment in which the closure element 4 passes beyond the position of maximum interference, a vibration perceptible by the user is generated, possibly accompanied by a sound like a "click".

In an embodiment, shown for example in FIG. 14, the cap can be provided, on an inner surface of the annular side wall or skirt 17 thereof, with a plurality of hooking elements 42 suitable for engaging, in the closed position, with the neck 3 of the container, in order to prevent the closure element 4 from being brought accidentally into the open position.

In particular, the hooking elements 42 can be suitable for engaging with the edge portion 31 of the neck 3, which, as already described, diverges outward.

It is also possible, in an unillustrated alternative embodiment, for the hooking elements 42 to engage with an annular bead, or with a plurality of projections, provided for this purpose on the neck 3 of the container.

The hooking elements 42 can be distributed in an angularly equidistant manner about an axis about which the skirt 17 extends. In the closed position, this axis coincides with the axis Z.

Each hooking element 42 can be conformed as a rib, extending in a longitudinal direction, for example parallel to the axis about which the skirt 17 extends. The rib can extend from the transverse wall 7 towards the separation line separating the retaining ring 2 from the closure element 4.

At an end of the rib opposite the transverse wall 7, there can be provided a hook 43 that projects towards the inside of the skirt 17 so as to engage, with interference, with the edge portion 31 of the neck 3.

The hook 43 can be shaped like a hook member or more in general as any protuberance projecting from the corresponding rib.

When the closure element 4 is arranged in the closed position, and is applied on the container resting on a horizontal surface, the hook 43 is below the edge portion 31. In order to move the closure element 4 into the open position, it is necessary to deform the hooking elements 42 and/or the skirt 17, so that the hooks 43 are disengaged from the edge portion 31 and the closure element 4 can be moved away from the neck 3. This requires applying a minimum force that is normally not generated accidentally.

Figure 34:
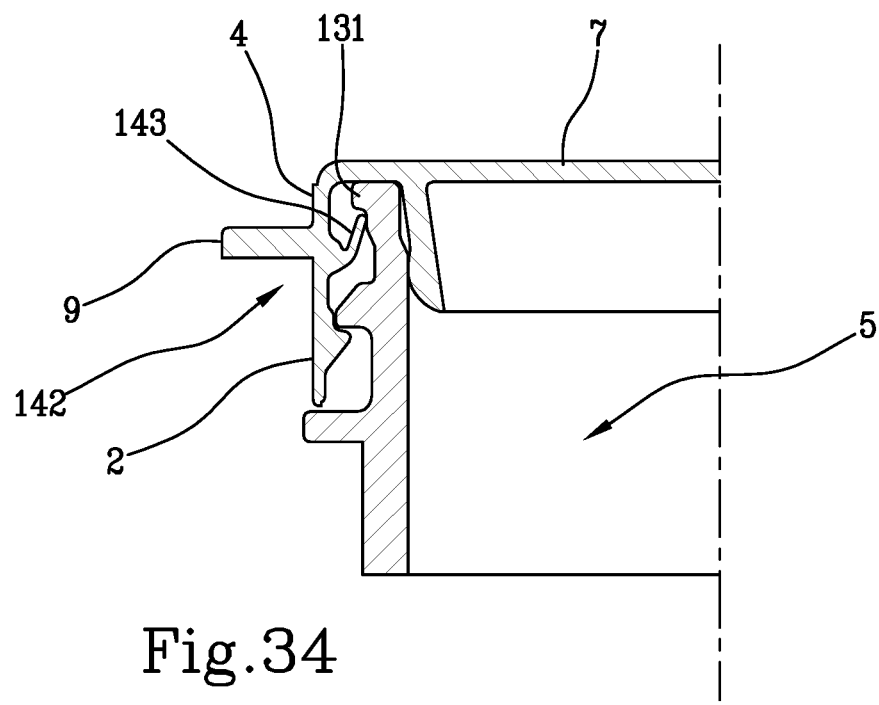
FIG. 34 is an interrupted sectional view showing a neck of a container on which a cap provided with a hooking element is applied.

In an alternative embodiment, shown in FIG. 34, there can be provided a hooking element 142 shaped like a flap 143 which projects from an inner surface of the closure element 4. The flap 143 can be folded upwards, i.e. towards the transverse wall 7 of the closure element 4.

The flap 143 can be configured to engage with an edge portion 131 of the neck of the container, when the closure element 4 is in the closed position, in order to prevent the closure element 4 from being accidentally brought into the open position. The edge portion 31, which delimits the neck near the opening 5, can project outwards.

In an embodiment, the flap 143 can be dimensioned so as to maintain a configuration in which the flap 143 is folded towards the transverse wall 7, when the closure element 4 is brought into the open position.

Alternatively, the flap 143 can be dimensioned so as to rotate and reach a configuration in which the flap 143 is folded downwards, i.e. towards the part opposite the transverse wall 7, when the flap 143 interferes with the neck because the closure element 4 is being brought into the open position. In this case, the flap 143 goes back into the configuration of being folded towards the transverse wall 7 when it interferes once again with the neck, while the closure element 4 is brought back into the closed position. When the flap 143 passes from the configuration of being folded towards the transverse wall 7 to the configuration of being folded towards the part opposite the transverse wall 7, a vibration perceivable by the user can be produced. In an embodiment, the vibration can be accompanied by a sound like a "click".

In the embodiment shown in FIG. 34, the flap 143 is positioned at the protrusion 9, i.e. it projects from the inner surface of a region of the skirt 17 from the outer surface of which the protrusion 9 projects. However, this condition is not necessary, as the flap 143 can be also be located in a different position from the one shown in FIG. 34.

Furthermore, more than one flap 143 can be provided. In general, the number of flaps 143 can be arbitrary. For example, two flaps 143 can be provided, arranged at diametrically opposite positions at an angular distance of about 90° from the protrusion 9.

The number and position of the hooking elements 42, 142 can be chosen freely depending on the force with which it is desired that the closure element 4 is maintained in the closed position.

The hooking elements 42, 142 can be associated not only with the cap shown in FIG. 14 or in FIG. 34, respectively, but also with any of the caps described herein.

The cap 101 shown in FIGS. 3 and 4 and the cap 1 shown in FIGS. 1 and 2 can be produced with the method described below. Of course, this method can also be used to obtain caps that are different from the ones described above, for example caps having a single connection band 18 or more than two connection bands 18.

First of all, there is provided a step of providing a cup-shaped body suitable for originating the cap 1, 101 in the closed position. The cup-shaped body has a side wall that extends about an axis, typically coinciding with the axis Z. The side wall corresponds to the retaining ring 2 and possibly to the skirt 17.

The cup-shaped body further has an end wall that extends transversely, in particular perpendicularly, to the axis Z. The end wall is intended to define, on the finished cap, the transverse wall 7 of the closure element 4.

The step of providing the cup-shaped body can comprise a step of moulding a polymeric material. During this step, the cup-shaped body is formed, particularly by means of compression moulding or by means of injection moulding.

Subsequently, there is provided a step of cutting the side wall of the cup-shaped body along the separation line 11 or 111 so as to define the retaining ring 2 and the closure element 4. This step is carried out using a cutting element that does not interact with the material forming the side wall of the cup-shaped body along the entire circumferential extension thereof about the axis Z. On the contrary, the cutting element scores the side wall for a circumferential or angular extension of the side wall that is less than 360°, so as to leave the material of the cup-shaped body intact at at least one connection band 18. In this manner at least one connection band 18 is defined.

In the example shown in FIGS. 1 to 4, during the cutting step the material of the cup-shaped body is left intact at two connection bands 18.

In other words, the cutting element does not interact with the side wall of the cup-shaped body (i.e. it does not even partially notch the thickness of the cup-shaped body) at the connection bands 18, or the connection band 18, should only one be provided.

This can occur because the connection bands 18 are defined inside the recesses 20. The cutting element can be configured to cut the material forming the side wall only at portions of the side wall having a diameter larger than a predefined limit value.

If the bottom of the recesses 20 is defined at a diameter smaller than the predefined limit value, the cutting element does not cut the material forming the side wall at the recesses 20. The connection bands 18 remain thus defined, i.e. intact, on the side wall of the cup-shaped body.

In other words, the step of cutting the side wall is carried out by a cutting element that scores the side wall for a thickness that is less than the depth of penetration of the recess 20 towards the inside of the side wall, so as to leave the connection band intact.

The cutting element at issue can comprise a blade, for example of the circular type, but can also be a cutting element of a different type, for example a laser. The cutting element can be positioned downstream of the mould in which the cup-shaped body is formed. In other words, the cutting step for generating the separation line 11 or 111 can be carried out after the cup-shaped body has been extracted from the mould.

It is also possible that, during the cutting step, the material of the cup-shaped body is left intact at the opening indicator element 12 and the breakable bridges 24, if present.

The method can further have a step of generating the cutting line 19, if present. The cutting line 19 can be generated during the cutting step which defines the separation line 11 or 111, for example using the same cutting element, or another cutting element.

The cutting of the side wall that originates the separation line 11 or 111, and/or the cutting line 19, can be carried out owing to a movement of relative rotation, about the axis Z, between the cutting element and the cup-shaped body. In other words, the cup-shaped body can rotate about the axis Z while the position of the cutting element about the axis Z is not modified, or the cutting element can be rotated about the axis Z while the cup-shaped body remains in a fixed position, or the cutting element and the cup-shaped body can be rotated simultaneously about the axis Z. The movement of relative rotation about the axis Z can take place along an angle of 360°, i.e. all around the axis Z, without determining an undesired cut of the connection bands 18. This is made possible by the fact that the connection bands 18, being formed in the recesses 20, do not interact with the cutting element, which cuts only the zones of the cup-shaped body that are arranged more superficially (i.e. externally) than the bottom of the recesses 20.

The method further comprises the step of producing at least two delimitation lines 21 which laterally delimit the connection band 18.

In the examples of FIGS. 1 to 4, in which two connection bands 18 are present, four delimitation lines 21 are produced during this step, i.e. two delimitation lines 21 for each connection band 18.

In the example illustrated, the step of producing the delimitation lines 21 takes place simultaneously with the step of providing the cup-shaped body. Both of these steps take place by moulding of a polymeric material.

In other words, the through slits that define the delimitation lines 21 are produced by moulding, inside the same mould in which the cup-shaped body is formed.

The recesses 20 are also formed by moulding, inside the same mould in which the cup-shaped body is formed.

As mentioned previously, the delimitation lines 21 and the recesses 20 extend up to the transverse wall 7 of the closure element 4. This ensures an easy opening of the mould in which the cup-shaped body is formed and avoids excessive complications of said mould.

In fact, after the cup-shaped body, provided with the recesses 20 and the delimitation lines 21, has been formed in the mould, it is possible to extract the cup-shaped body from the mould in a simple manner, by using movements of linear translation of the parts of the mould. In other words, it is not necessary to use complicated rotation movements or provide retractable parts, as would be the case if undercuts were present.

In an unillustrated alternative embodiment, the delimitation lines 21 can be conformed as weakening lines not passing through the thickness of the side wall rather than slits passing through the thickness of the side wall.

In this case as well, the step of producing the delimitation lines 21 can take place simultaneously with the step of providing the cup-shaped body.

In particular, the delimitation lines 21 conformed as weakening lines can be obtained by moulding, inside the same mould in which the cup-shaped body is formed.

In the above-described method, the cap 1 or 101 is formed in a closed configuration, since there is envisaged providing the cup-shaped body and then producing the separation line 11 or 111 on the latter.

In contrast, in most of the known methods for producing caps of the snap-on type by injection moulding, the cap is formed in an open configuration and subsequently closed.

Figure 5:
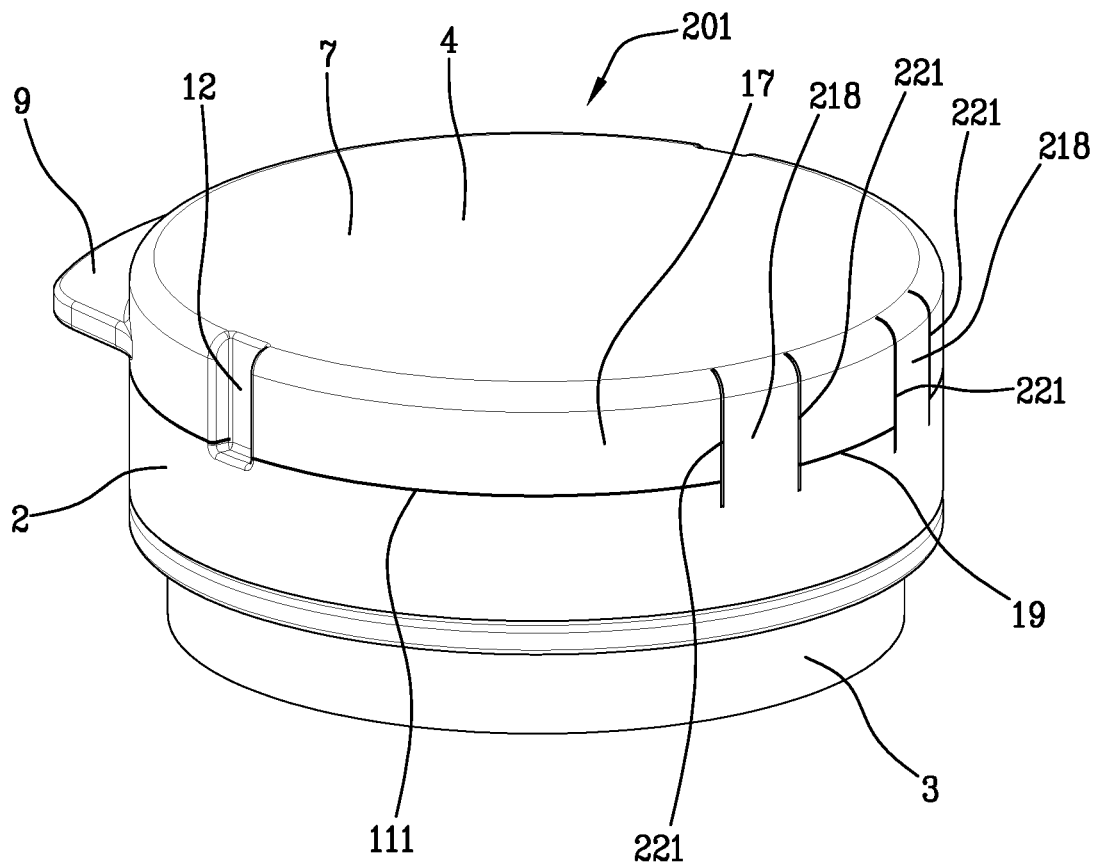
FIG. 5 is a perspective view of a cap according to a further alternative embodiment, fastened to a neck of a container.

FIG. 5 shows a cap 201 according to an alternative embodiment. The parts of the cap 201 in common with those of the caps 1 and 101 described previously are indicated with the same reference numbers previously used and will not be described again in detail.

The cap 201 shown in FIG. 5 differs from the caps 1 and 101 described previously mainly in that it does not comprise the recesses 20 inside which the connection bands 18 are defined.

The cap 201 is provided with two connection bands 218 which extend on the same cylindrical surface that defines the skirt 17 of the closure element 4, i.e. the connection bands 218 are flush with the skirt 17. In other words, the connection bands 218 are delimited by an outer surface flush with the outer surface delimiting the side wall of the cap 201.

Each connection band 218 is laterally delimited by two delimitation lines 221 in the form of cuts passing through the thickness of the cap 201.

The delimitation lines 221, or more precisely the respective through cuts, extend up to the transverse wall 7 of the closure element 4.

On the side opposite the closure element 4, the delimitation lines 221, or more precisely the respective through cuts, can extend slightly below the separation line 111.

The cutting line 19 is provided between the connection bands 218. The cutting line 19 can extend between the two more internal delimitation lines 221, arriving in contact with said lines.

In the example illustrated, the cutting line 19 is aligned with, i.e. it lies on the same plane as, the separation line 111, even though this condition is not necessary.

The cap 201 can be produced with a method that is similar to the one described previously with reference to the caps 1 and 101, i.e. starting from a cup-shaped body whose side wall is cut along the separation line 111.

However, rather than producing the delimitation lines by moulding, there is provided a step of producing the delimitation lines 221 by cutting. This step can take place after the cup-shaped body has been provided, and in particular after the cup-shaped body has been extracted from the mould, simultaneously with (or before or after) the cutting step enabling the separation line 111 and the cutting line 19, if present, to be obtained.

The conformation shown in FIG. 5, in which the delimitation lines 221 extend up to the transverse wall 7, can be appreciable when certain types of cutting elements are used, because it can easily allow the cutting element to disengage from the cup-shaped body, and in particular from the transverse wall 7, after the delimitation lines 221 have been produced.

The embodiment shown in FIGS. 1 and 2 and the further embodiment shown in FIGS. 3 and 4 have the advantage that the cutting operations intended to originate the separation line 11 or 111 and the cutting line 19 can be carried out in a very simple manner.

The separation line 11 or 111 and the cutting line 19 can be produced in a single step, possibly by using the same cutting element, which engages with circumferentially successive portions of the side wall of the cup-shaped body. Furthermore, owing to the recesses 20, it is not necessary that the cutting operations intended to produce the separation line 11 or 111 and the cutting line 19 take place only in preset angular positions of the side wall, i.e. in an angularly timed manner relative to the connection bands 18. In fact, the recesses 20 prevent the cutting element, shaped for example like a circular blade that penetrates into the side wall of the cup-shaped body for a certain depth, from interacting with the material forming the side wall of the cup-shaped body, at the zones in which the connection bands 18 must be generated. The connection bands 18 remain thus defined. The connection bands 18 are not affected by the cutting operations because they are too far from the blade.

In the embodiments shown in FIGS. 1 to 4, however, the mould has a few complications, albeit minimal ones, due to the need to produce the recesses 20 and the delimitation lines 21 inside the mould.

In the embodiment shown in FIG. 5, the mould intended to form the cup-shaped body is extremely simple, as the side wall has a substantially cylindrical shape.

On the other hand, the cutting operations intended to form the separation line 111, the cutting line 19 and the delimitation lines 221 are slightly more complicated than in the cases of FIGS. 1 to 4.

In fact, the cut giving rise to the separation line 111 and the cutting line 19 has to be located in a well-defined angular position, on the side wall of the cup-shaped body, relative to the cuts giving rise to the delimitation lines 221. In other words, the cutting operations giving rise to the separation line 111, the cutting line 19 and the delimitation lines 221 have to be angularly timed about the axis Z.

It is further noted that, when the embodiments of the cap shown in FIGS. 1 to 4 have delimitation lines 21 conformed as weakening lines not passing completely through (i.e. having a reduced thickness compared to neighbouring zones of the cap), a cap is obtained which has very good performance from a hygienic point of view because the entry of solid particles inside the container is substantially prevented. In fact, solid particles cannot pass through the delimitation lines 21, in which the continuity of the material is not interrupted, nor through the separation line 11, 111 or the cutting line 19, whose edges are extremely close.

The embodiment of the cap shown in FIG. 5 also has good hygienic properties, because the mutually facing edges of the delimitation lines 221 are very close to one another and make it very difficult for any solid particles to enter into the cap.

FIGS. 15 and 16 show a cap 41 according to an alternative embodiment. The cap 41 is similar to the cap 201 shown in FIG. 5, from which it differs mainly in that the hinge structure 6 comprises a projection 32 that projects towards the outside of the cap 41 like a tab. The projection 32 is provided on the closure element 4, in a position interposed between the more internal delimitation lines 221 which delimit the connection bands 218. The projection 32 projects from the skirt 17 between the cutting line 19 and the transverse wall 7.

In the example illustrated, the projection 32 is substantially flat and extends parallel to a plane arranged transversely, in particular perpendicularly, to the axis Z of the cap 41. In particular, the projection 32 extends parallel to the cutting line 19.

The projection 32 is delimited by an outer edge 33, interposed between an upper face 34 and a lower face 35 which delimit the projection 32 towards the transverse wall 7 and towards the retaining ring 2, respectively.

As will be better described below, the projection 32 enables the closure element 4 to be kept stably in the open position. Furthermore, the projection 32 can enable the closure element 4 to generate a vibration when the closure element 4 is moved from the closed position to the open position or vice versa. As shown in FIG. 17, when the closure element 4 is rotated towards the open position, the projection 32 is also rotated and comes closer to the lower edge 22 which delimits the cutting line 19. While continuing to rotate the closure element 4, the projection 32 starts to interact with the lower edge 22, until reaching a position of maximum interference. The open position is reached after the projection 32, and in particular the outer edge 33 thereof, passes beyond the position of maximum interference between the projection 32 and the outer edge 33. In the open position, the projection 32 continues to interfere with the retaining ring 2, which prevents the closure element 4 from going back into the closed position without the user's intervention.

It is noted that, in the open position of the embodiment shown in FIG. 17, the closure element 4 is rotated by a large angle relative to the retaining ring 2, which assures that the closure element 4 cannot hit the nose of a user who is drinking from the container closed by the cap 41.

Furthermore, when the projection 32 passes beyond the position of maximum interference relative to the retaining ring 2, a vibration perceivable by the hand of the user who is rotating the closure element 4 can be generated. The vibration can be accompanied by a sound like a "click".

In an unillustrated embodiment, the behaviour described above with reference to the interference between the lower edge 22 and the projection 32 can be due instead to the interference between the side wall of the retaining ring 2 (arranged below the lower edge 22) and the projection 32.

The behaviour of the closure element 4 (as regards the stability of the open position, the vibration, if any, and the "click", if any) can be of the type described with reference to FIG. 17, or with reference to FIG. 14, when the connection bands are lengthened to a significant degree while the closure element 4 is being opened. In this case, the lower edge 22 and the upper edge 23 defined by the cutting line 19 do not interfere with each other during the rotation of the closure element 4.

If, on the other hand, the connection bands are not lengthened to a significant degree while the closure element 4 is being opened, the stability of the open position, the vibration, if any, and the sound like a "click", if any, can be generated in the manner described with reference to FIG. 13, i.e. due to the interference between the lower edge 22 and the upper edge 23 of the cutting line 19.

The cap 41 shown in FIGS. 15 and 16 can be obtained in the same manner as the cap 201 shown in FIG. 5. The projection 32 is obtained, particularly by moulding, during the step of providing the cup-shaped body.

FIGS. 6 to 12 schematically show some embodiments of the hinge structure that can be adopted in caps of the type shown in FIGS. 1 to 5, produced with methods similar to the ones previously described.

Figure 6:
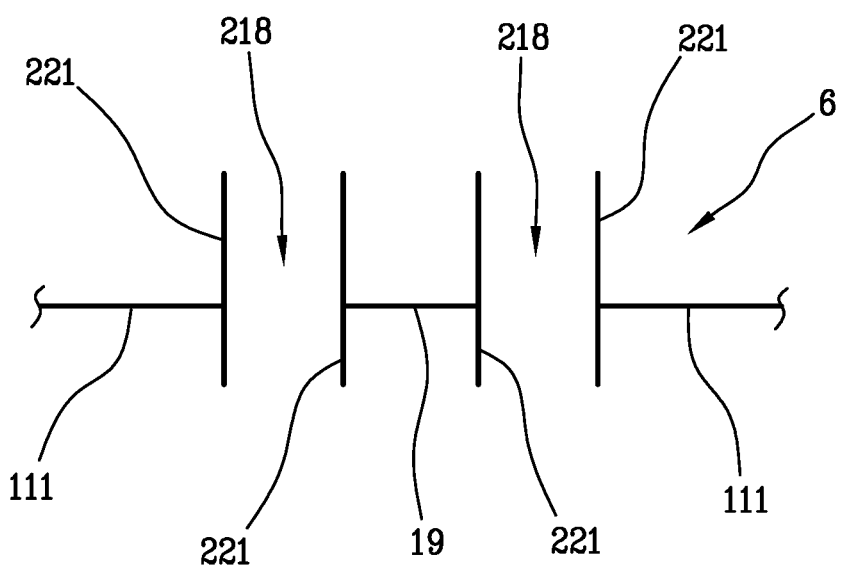
FIGS. 6 to 12 are schematic views showing respective embodiments of a hinge structure for a cap for a container.

FIG. 6 shows a hinge structure 6 substantially identical to the one of the cap of FIG. 5, i.e. in which the delimitation lines 221 delimiting the connection bands 218 are conformed as cuts passing through the thickness of the side wall of the cup-shaped body.

The cutting line 19 is at the same level as the separation line 111.

The delimitation lines 221 extend mainly above the separation line 111, i.e. in the closure element 4. However, a part of the delimitation lines 221 also extends below the separation line 111, i.e. in the retaining ring 2.

The delimitation lines 221 are parallel to each other, and are also parallel to the axis Z.

The separation line 111 and the cutting line 19 are perpendicular to the axis Z. In this case as well, two connection bands 218 are provided.

Figure 7:
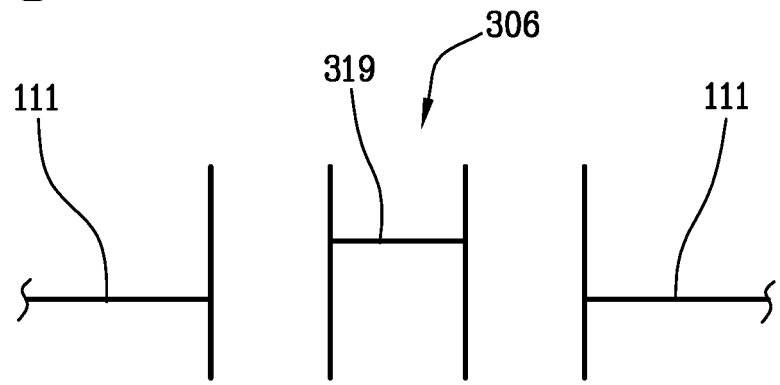

FIG. 7 shows a hinge structure 306 that differs from the hinge structure 6 shown in FIG. 6 in that it comprises a cutting line 319 which is not at the same level as the separation line 111.

The cutting line 319 is shifted towards the closure element 4 with respect to the separation line 111, i.e. it is at a higher level than the separation line 111.

This makes it possible to modify the properties of the hinge structure, as the closure element 4 rotates about a rotation axis that is positioned higher than in the case of FIG. 6.

Figure 8:
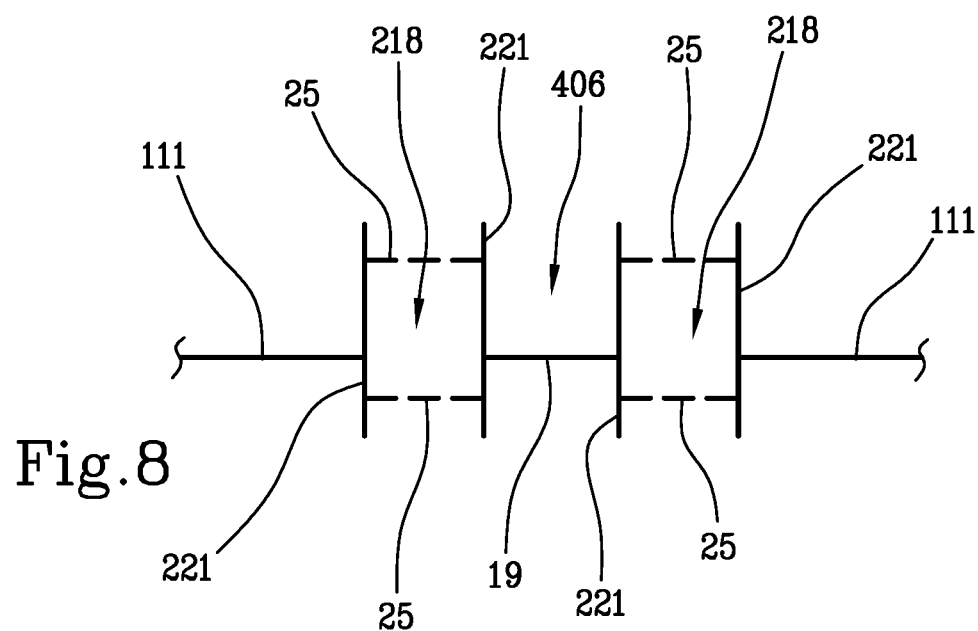

FIG. 8 shows a hinge structure 406 that differs from the hinge structure 6 shown in FIG. 6 in that inside each connection band 218 two weakening portions 25 are provided. The weakening portions 25 are conformed as lines having a reduced thickness compared to the neighbouring zones of the cap.

In particular, in each connection band 218, a weakening portion 25 extends in the retaining ring 2, i.e. below the separation line 111, whereas the other weakening portion 25 extends in the closure element 4, i.e. above the separation line 111.

The weakening portions 25 extend transversely, in particular perpendicularly, to the axis Z.

Figure 10:
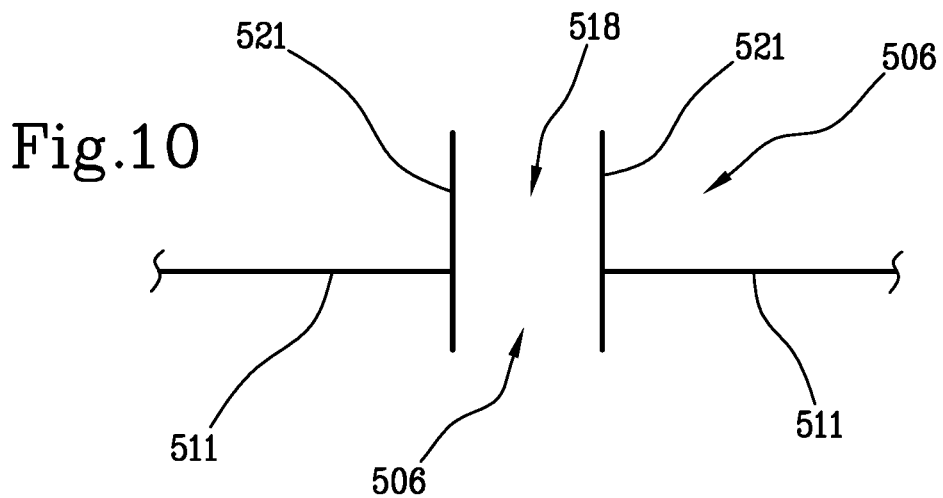

The weakening portions 25 can extend continuously from one delimitation line 221 to the other delimitation line 221 delimiting the same connection band 218. The weakening portions 25 have been drawn with a broken line in FIG. 8 to indicate that they are lines which do not pass through the connection band 218. FIG. 10 shows a hinge structure 506 in which there is provided a single connection band 518, which interrupts the separation line 511.

In the example illustrated, the connection band 518 is delimited by two delimitation lines 521 conformed as through cuts. The delimitation lines 521 extend mainly in the closure element 4, i.e. above the separation line 511, but they can also continue below the separation line 511, i.e. in the retaining ring 2.

The cap comprising the hinge structure 506 can be produced using a method similar to the one previously described with reference to the cap of FIG. 5.

Figure 11:
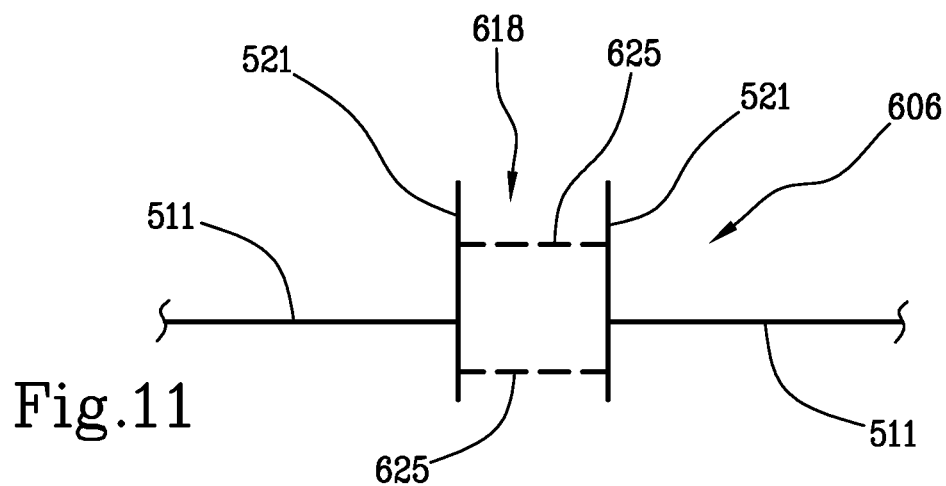

FIG. 11 shows a hinge structure 606 that differs from the one of FIG. 10 in that comprises a connection band 618, inside which two weakening portions 625 are provided, similar to the weakening portions 25 of the embodiment in FIG. 8.

One of the weakening portions 625 extends in the retaining ring 2, i.e. below the separation line 511. The other weakening portion 625 extends in the closure element 4, i.e. above the separation line 511.

The weakening portions 625 are directed transversely, in particular perpendicularly, to the axis Z.

The weakening portions 625 are conformed as weakening lines which do not pass through the entire thickness of the side wall of the cap.

Each weakening portion 625 can extend continuously from one delimitation line 521 to the other delimitation line 521.

Figure 18:
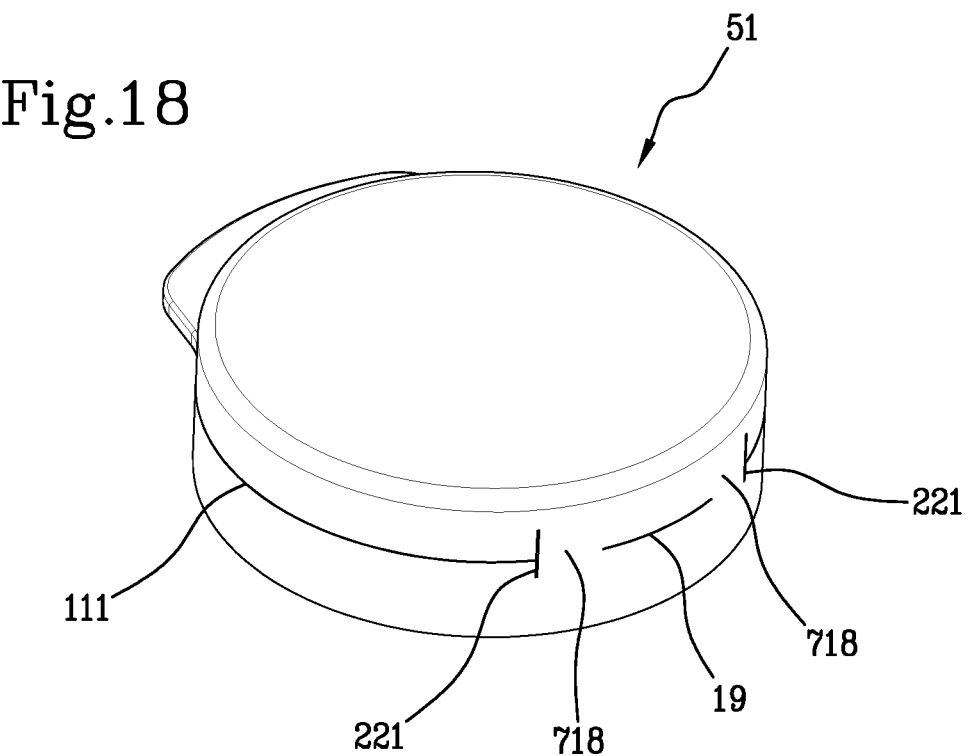
FIGS. 18 to 20 are perspective views showing corresponding caps according to respective alternative embodiments.

FIG. 18 shows a cap 51 according to another alternative embodiment. The cap 51 is similar to the cap 201 shown in FIG. 5, from which it differs mainly in that it lacks the more internal delimitation lines 221, i.e. the ones closer to the cutting line 19.

In the cap 51 it is still possible to identify two connection bands 718, which connect the closure element 4 to the retaining ring 2. Each connection band 718 is in this case delimited on one side by a delimitation line 221, and on the other side by one end of the cutting line 19.

The cap 51 can be produced with the method previously described with reference to FIG. 5.

Figure 9:
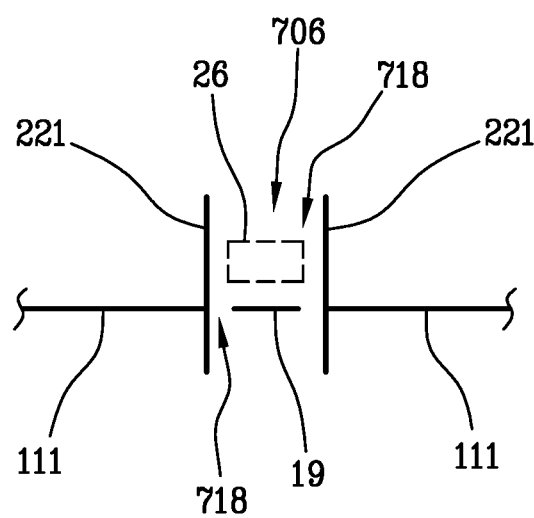

FIG. 9 shows a hinge structure 706 comprising two connection bands 718, similar to the connection bands 718 shown in FIG. 18. In FIG. 9 as well, the connection bands 718 are separated by a cutting line 19, which extends transversely, in particular perpendicularly, to the axis Z.

Each connection band 718 is delimited by a delimitation line 221, for example conformed as a through cut extending from the side of the connection band 718 adjacent to the separation line 111.

The cutting line 19 can be aligned with, i.e. on the same level as, the separation line 111.

The hinge structure 706 further comprises a projection 26 that is wholly similar to the projection 32 shown in FIGS. 15 and 16. The projection 26, which can have, for example, a rectangular shape, projects from an outer surface of the cap.

The projection 26 is arranged above the cutting line 19.

The projection 26 is configured to keep the closure element 4 stably in an open position in which the closure element 4 has been rotated by a considerable angle relative to the retaining ring 2. Furthermore, the projection 26 can enable a vibration to be generated, possibly accompanied by a sound like a "click", when the closure element 4 is rotated, as described previously with reference to FIG. 17.

Figure 12:
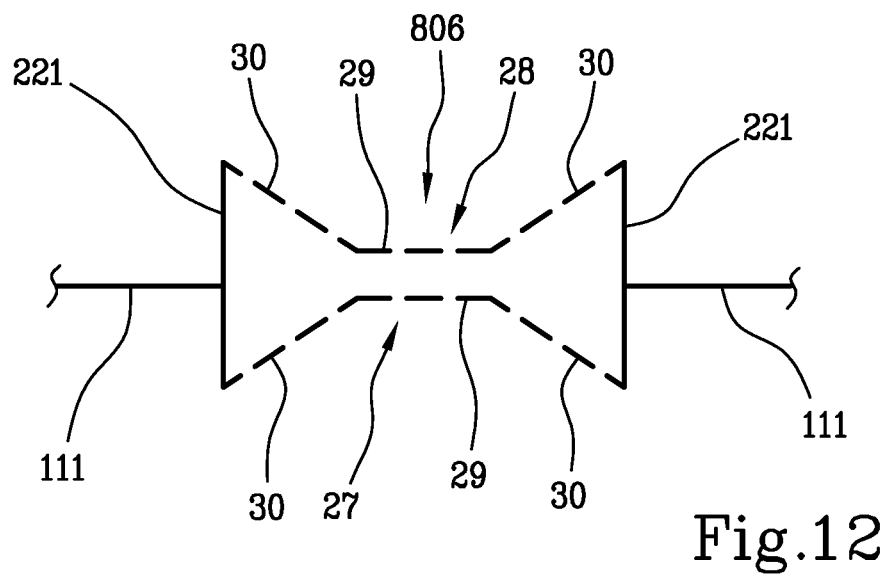

FIG. 12 shows a hinge structure 806 delimited by two delimitation lines 221 that can be conformed as through cuts.

The hinge structure 806 comprises an arrangement of weakening lines having a reduced thickness compared to the neighbouring zones of the material forming the cap, i.e. not passing through the thickness of the cap. For this reason these weakening lines have been represented as broken lines.

The weakening lines are interposed between the delimitation lines 221.

The arrangement of weakening lines comprises a plurality of weakening lines, in particular two weakening lines, which define a butterfly-shaped arrangement. In particular, the arrangement of weakening lines can comprise a lower weakening line 27, adjacent to the closure element 4, and an upper weakening line 28, adjacent to the retaining ring 2. Both the lower weakening line 27 and the upper weakening line 28 comprise a central portion 29 disposed transversely, in particular perpendicularly, to the axis Z. The central portions 29 of the lower weakening line 27 and respectively of the upper weakening line 28 are mutually facing. In the example illustrated, the central portions 29 are parallel to each other.

Both the lower weakening line 27 and the upper weakening line 28 each comprise two peripheral portions 30 between which the corresponding central portion 29 is interposed.

In particular, each peripheral portion 30 starts off from an end of the central portion 29 until reaching an end of a delimitation line 221.

Therefore, the lower weakening line 27 and the upper weakening line 28 are mutually facing along two pairs of peripheral portions 30, the peripheral portions 30 of each pair being divergent from each other.

The above-described figures show embodiments wherein one or two connection bands are present. In general, it is possible to provide an arbitrary number of connection bands.

Figure 19:
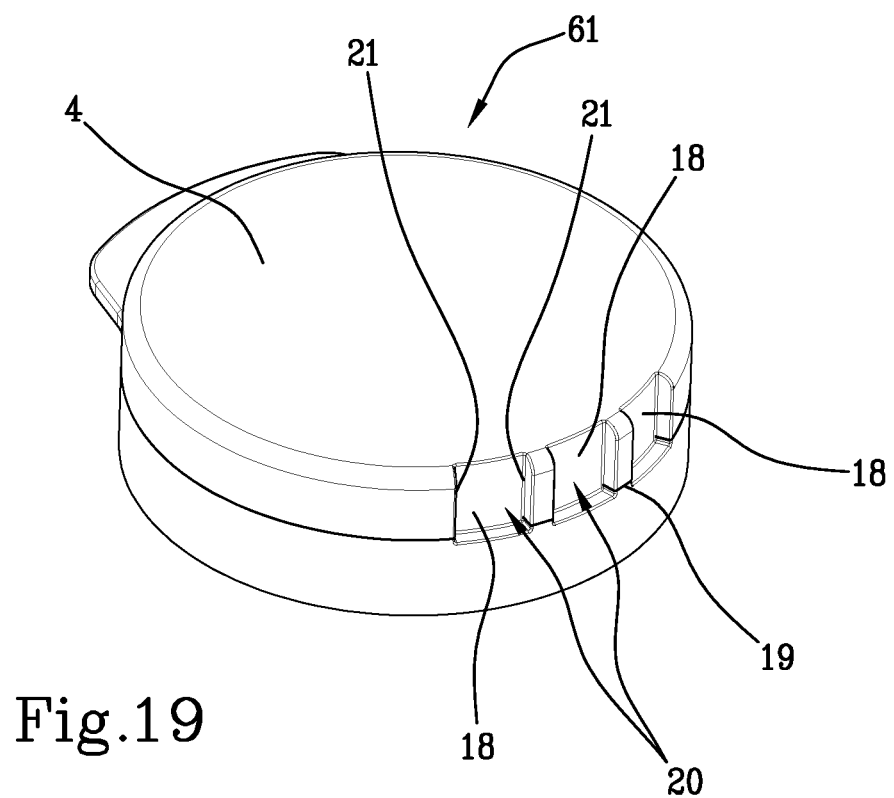

For example, FIG. 19 shows a cap 61 provided with three connection bands 18. Each connection band 18 is provided inside a recess 20 and is delimited by two delimitation lines 21 which can be conformed as through slits or weakening lines that do not pass through the entire thickness of the material forming the cap 61. Two adjacent connection bands 18 are separated by a cutting line 19.

When the closure element 4 is brought into the open position, the connection band 18 arranged in a central position yields only a little or does not yield at all, i.e. it undergoes a plastic deformation of minor entity or even none at all. In this manner, the central connection band 18 enables to guide movements of reclosing the cap and subsequently reopening it. The connection bands 18 arranged in an external position, by contrast, deform permanently to a much greater degree than the central connection band 18. In this manner, the connection bands 18 arranged in a more external position enable the cap 61 to be kept open, unless the user deliberately acts on the closure element 4.

The cap 61 can be formed with the method described with reference to the caps of FIGS. 1 to 4.

However, it is also possible to provide more than two connection bands in a cap of the type shown in FIG. 5, i.e. in a cap in which the recesses 20 are not present.

Figure 20:
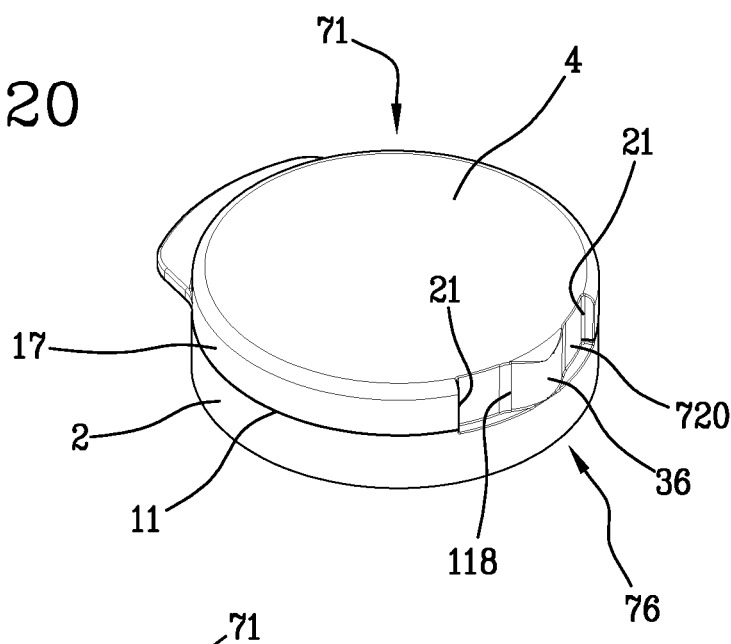
Figure 21:
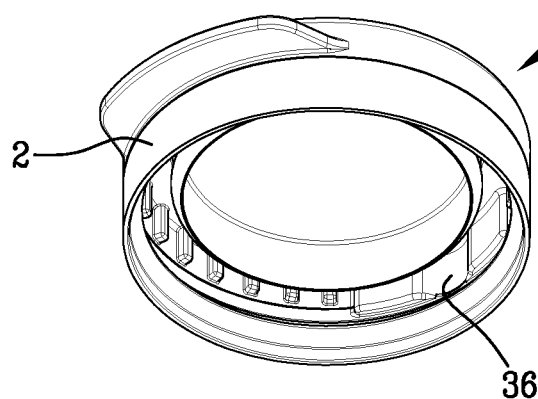
FIG. 21 is a perspective view showing the inside of the cap of FIG. 20.
Figure 22:
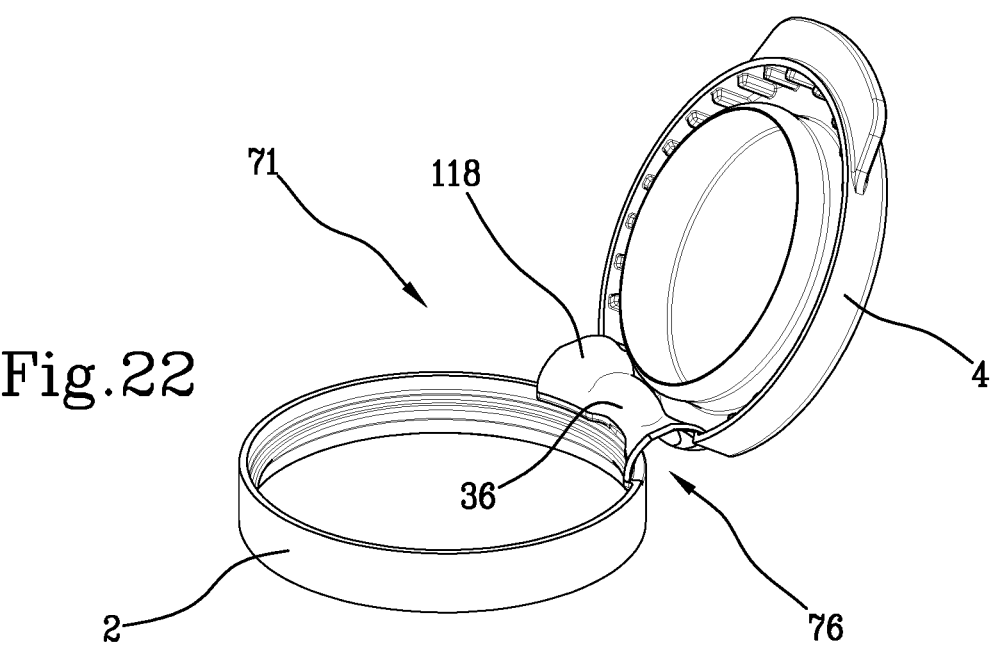
FIG. 22 is a perspective view showing the cap of FIGS. 20 and 21 in an open position.

FIGS. 20 to 22 show a cap 71 according to an alternative embodiment, comprising a retaining ring 2 and a closure element 4 connected to each other by means of a hinge structure 76.

The hinge structure 76 is conformed as a single connection band 118, which can be housed in a recess 720 of the closure element 4. The recess 720 is laterally delimited by two delimitation lines 21, which can be conformed as through slits or weakening lines not passing through the entire thickness of the cap 71.

In a central region thereof, the connection band 118 has a projecting part 36 which projects towards the outside of the cap 71 when the closure element 4 is in the closed position shown in FIGS. 20 and 21. The projecting part 36 can have a thickness that is substantially equal to the thickness of the neighbouring regions of the hinge structure 76. In particular, the projecting part 36 can have a thickness equal to the thickness of the skirt 17 of the closure element 4.

In the closed position of the closure element 4, the projecting part 36 is conformed as a portion of a curved, in particular convex, wall having a convexity facing towards the outside of the cap 71. This convex wall portion can, in the closed position of the closure element 4, extend partially about an axis parallel to the axis Z of the cap 71. The projecting part 36 projects from the recess 720. The radially outermost portion of the projecting part 36 can be flush with the outer surface of the retaining ring 2.

In the embodiment shown in FIGS. 20 to 22, no cutting line extending transversely to the axis Z in a position interposed between the delimitation lines 21 is present in the hinge structure 76. In an unillustrated embodiment, however, a cutting line, similar to the cutting line 19 described with reference to the previous embodiments, could be interposed between the delimitation lines 21.

When the closure element 4 is rotated about the hinge structure 76 so as to bring it into the open position shown in FIG. 22, the connection band 118 is subjected to a tensile stress. Due to this tensile stress, the projecting part 36 inverts its concavity when passing into the open position. In other words, the projecting part 36, which in the closed position had a concavity facing towards the inside of the cap, in the open position has a concavity facing towards the outside of the cap, as shown in FIG. 22. This change in concavity enables the closure element 4 to be kept stably in the open position until the user acts on the closure element 4 in order to bring it into the closed position. That is, accidental or in any case unwanted reclosing of the closure element 4 is precluded. Furthermore, the change in the concavity of the projecting part 36 can be perceived by the user as a vibration, possibly accompanied by a sound like a "click".

The cap 71 can be produced with the method previously described. In particular, the cap 71 can be produced starting from a cup-shaped body that is subsequently subjected to a cutting operation in order to obtain the separation line 11.

The recess 720, the projecting part 36 and the delimitation lines 21 can be obtained during the step of providing the cup-shaped body, particularly by moulding.

Figure 23:
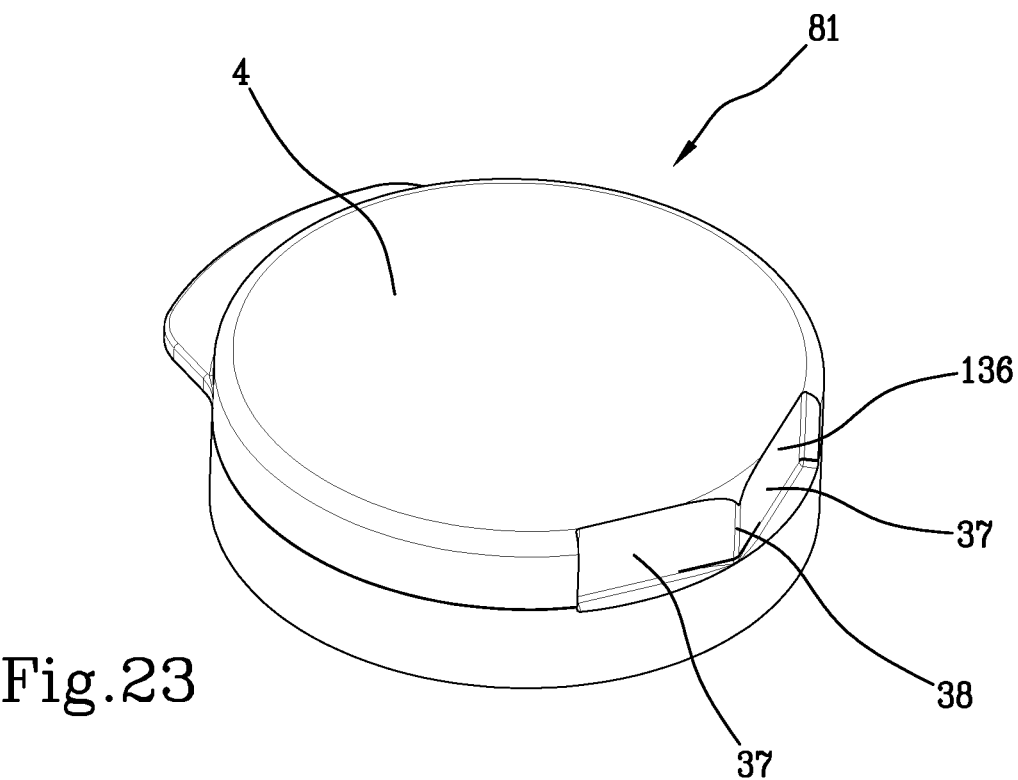
FIG. 23 is a perspective view showing a cap according to an alternative embodiment.
Figure 24:
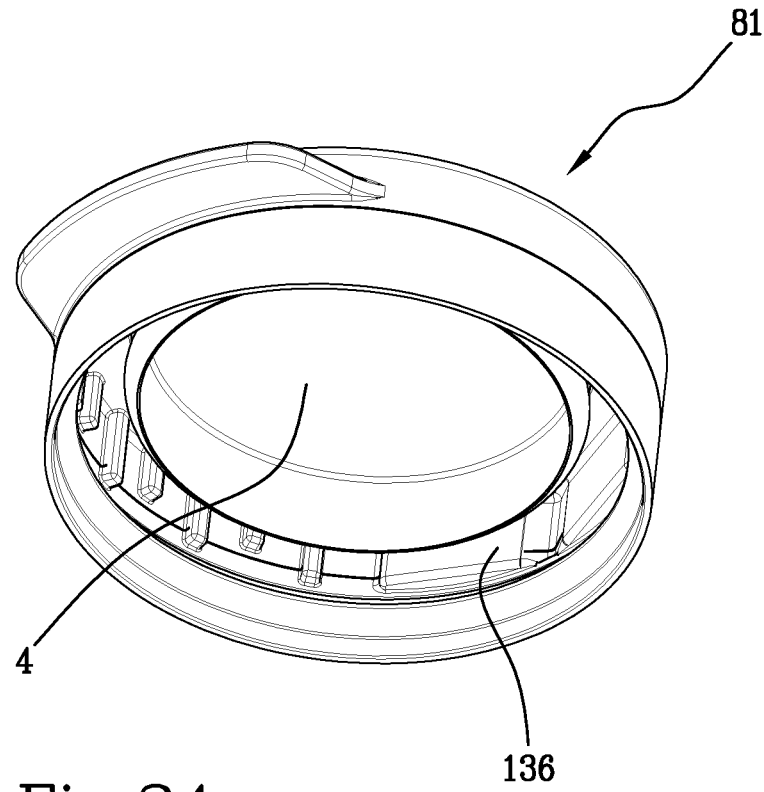
FIG. 24 is a perspective view showing the inside of the cap of FIG. 23.
Figure 25:
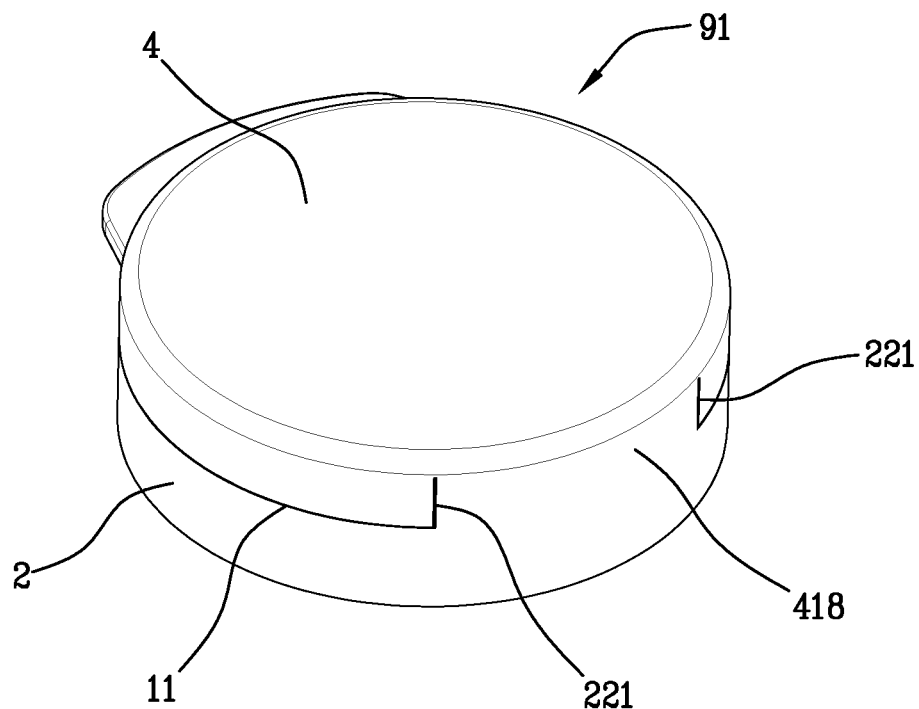
FIG. 25 is a perspective view showing a cap according to another alternative embodiment.
Figure 26:
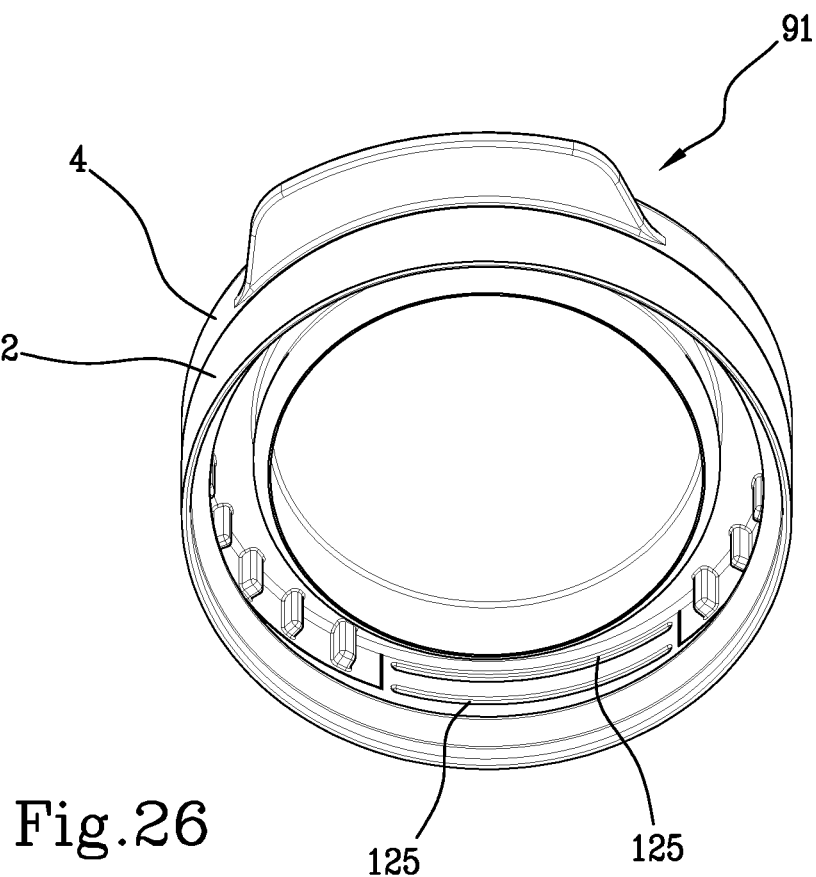
FIG. 26 is a perspective view showing the inside of the cap of FIG. 25.

FIGS. 23 and 24 show a cap 81 that is similar to the cap shown in FIGS. 20 to 22, in which the projecting part is configured according to an alternative embodiment. In detail, the cap 81 is provided with a cusp-shaped projecting part 136. The projecting part 136 is defined by two lateral surfaces 37 joined along a pointed edge 38. The latter can be parallel to the axis Z of the cap. Similarly to what was previously described with reference to FIGS. 20 to 22, when the closure element 4 of the cap 81 passes from the closed position to the open position, the projecting part 136 inverts its concavity. In fact, whereas in the closed position shown in FIGS. 23 and 24 the projecting part 136 has a convexity facing towards the outside of the cap 81, which means that the cusp projects towards the outside of the cap 81, in the open position, not illustrated, the projecting part 136 has a convexity facing towards the inside of the cap 81, i.e. the cusp projects towards the inside of the cap 81. This helps to keep the closure element 4 stably in the open position. In some cases, at the moment in which the concavity of the projecting part 136 is inverted, a vibration perceivable by the user is further generated.

FIGS. 29 to 33 show a cap 191 according to an alternative embodiment, comprising a retaining ring 2 and a closure element 4, joined to the retaining ring 2 by means of a hinge structure 96. Externally of the hinge structure 96, the closure element 4 is separated from the retaining ring 2 along a separation line 11.

The hinge structure 96 comprises a single connection band 318, laterally delimited by two delimitation lines 21. The latter can be conformed as weakening lines having a reduced thickness compared to the neighbouring zones of the cap 191, or as slits passing through the entire thickness of the cap 191.

The connection band 318 is housed inside a recess 920, i.e. it has an outer surface 39 that is recessed towards the inside of the cap 191 relative to the outer surface of the skirt 17.

As shown in FIGS. 30 and 31, the connection band 318 is provided with two weakening lines 125, conformed as lines in which the material forming the cap 191 has a reduced thickness compared to the neighbouring zones.

The weakening lines 125 are provided on an inner surface of the connection band 318, i.e. on a surface of the connection band 318 facing towards the inside of the cap 191.

The weakening lines 125 can be in the form of small channels formed on the inner surface of the connection band 318.

In the example illustrated, each weakening line 125 has a rectilinear geometry. Furthermore, the weakening lines 125 are parallel to each other.

However, the weakening lines 125 can also be non-rectilinear, or not parallel to each other. For example, the weakening lines 125 can be curved, with respective facing convexities.

When a user applies on the closure element 4 a force suitable for moving the closure element 4 from the closed position to the open position, the closure element 4 moves away from the retaining ring 2, by rotating about the hinge structure 96. In particular, in a first phase of the opening movement, the closure element 4 rotates about the weakening line 125 that is closer to the retaining ring 2, i.e. the weakening line 125 which, when the cap 191 is applied on the neck of the container, is in a lower position. In this phase, the rotation about the weakening line 125 that is closer to the transverse wall 7, i.e. the upper weakening line 125, is practically negligible.

Figure 32:
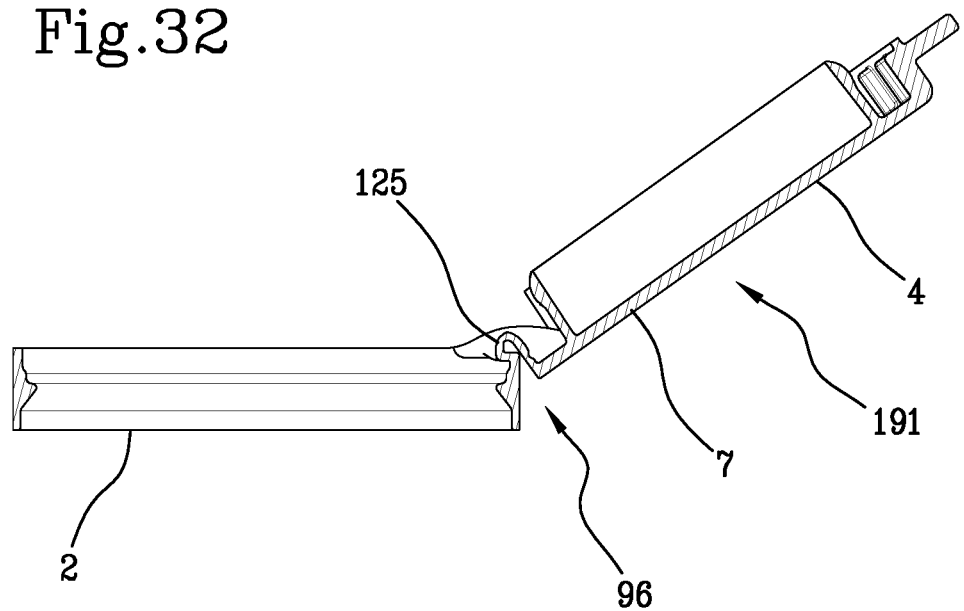
FIG. 32 is a sectional view like the one in FIG. 31, showing the cap of FIG. 29 in an intermediate position.

The rotation about the weakening line 125 that is closer to the retaining ring 2 continues until an intermediate position is reached, shown in FIG. 32, in which the outer surface 39 of the connection band 318 can be abutting against a step 40 defined in a zone in which the retaining ring 2 is joined to the connection band 318.

Figure 33:
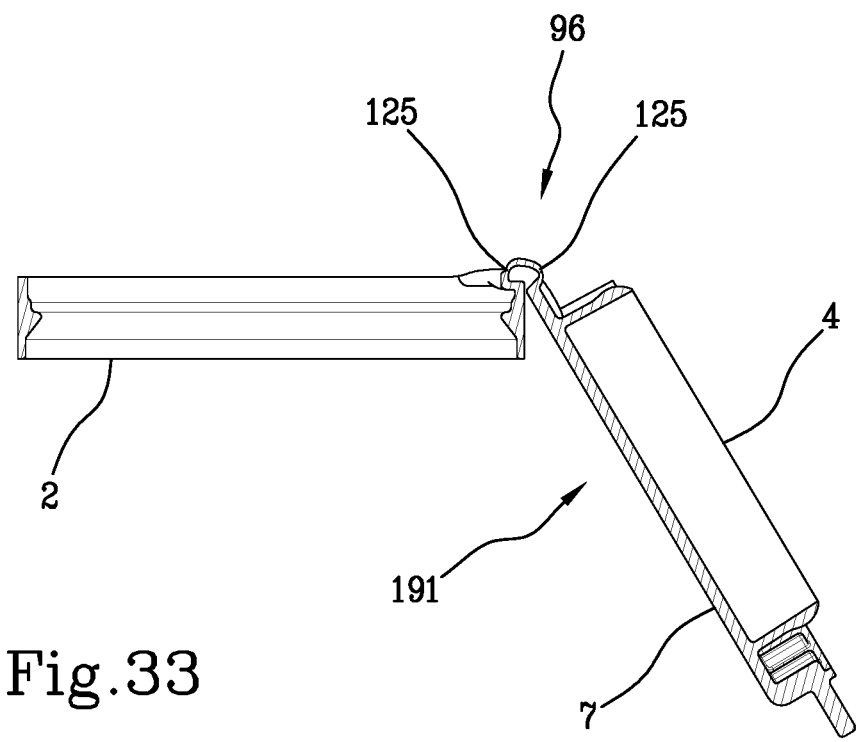
FIG. 33 is a sectional view like the one in FIG. 31, showing the cap of FIG. 29 in an open position.

If, from the intermediate position shown in FIG. 32, the user continues to apply an opening force on the closure element 4, the latter starts rotating about the weakening line 125 that is closer to the transverse wall 7, until reaching the open position shown in FIG. 33. In this position, an upper edge 41 of the connection band 318 (at which the connection band 318 is joined to the transverse wall 7) can abut against the retaining ring 2.

The intermediate position shown in FIG. 32 is a stable position, from which the closure element 4 can be moved only after a minimum force has been applied. This minimum force serves to deform the portion of the connection band interposed between the two weakening lines 125, so that said portion bends towards the inside of the cap 191. Only after the portion of the connection band interposed between the weakening lines 125 has been deformed, it is possible to rotate the closure element 4 about the weakening line 125 that is closer to the transverse wall 7.

In an embodiment, when the intermediate position shown in FIG. 32 is reached, a first vibration is generated which is perceivable by the hand of the user who is opening the cap 191 and can be accompanied by a sound like a "click". When the intermediate position shown in FIG. 32 is passed and the open position shown in FIG. 33 is reached, the portion of the connection band 318 interposed between the two weakening lines 125 snaps towards the inside of the cap 191, thereby producing a second vibration perceivable by the hand of the user who is opening the cap 191. The second vibration can also be accompanied by a sound like a "click". In other words, during the opening of the cap 191, two vibrations are generated, caused respectively by the rotation about the weakening line 125 that is closer to the retaining ring 2 and the rotation about the weakening line 125 that is closer to the transverse wall 7. The purpose of the second vibration, i.e. of the vibration that is generated when the closure element 4 rotates about the weakening line 125, is also that of keeping the closure element 4 stably in a more open position than the one reached after the rotation about the weakening line 125 that is closer to the retaining ring 2.

The opposite occurs when, starting from the open position shown in FIG. 33, the cap 191 is closed.

The cap 191 can be produced by means of the method previously described with reference to FIGS. 1 to 4. In this case, the recess 920, the delimitation lines 21 and the weakening lines 125 are produced inside the mould in which the cup-shaped body is obtained.

The separation line 11 is subsequently obtained by means of a cutting operation. The cutting operation need not be exactly timed with respect to the side wall of the cup-shaped body because, owing to the recess 920, the cutting element does not interfere with the connection band 318.

Figure 35:
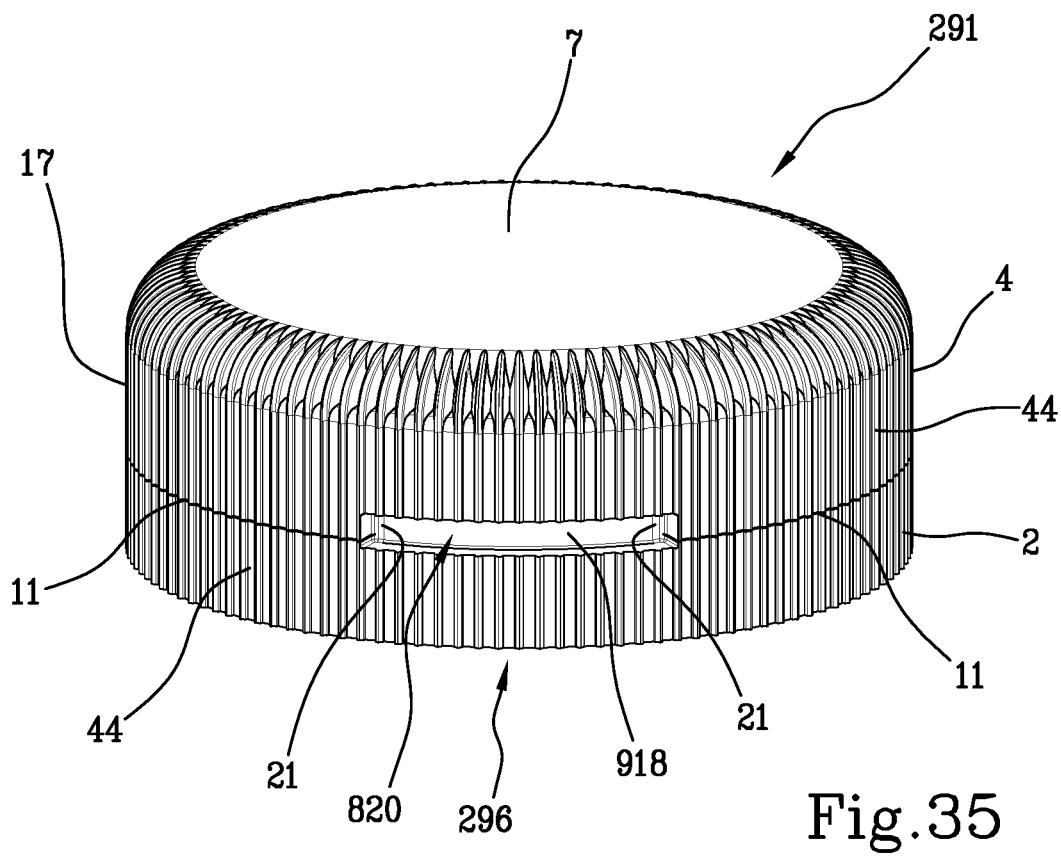
FIG. 35 is a perspective view showing a cap according to an alternative embodiment.

FIG. 35 shows a cap 291 according to an alternative embodiment, which exhibits numerous similarities with the cap 191 shown in FIGS. 29 to 33. The parts of the cap 291 in common with those of the cap 191 will be indicated with the same reference numbers used in FIGS. 29 to 33 and will not be described again in detail.

The cap 291 comprises a hinge structure 296 having a connection band 918 provided inside a recess 820. However, whereas the recess 920 of the cap 191 shown in FIGS. 29 to 33 extended up to the transverse wall 7, the recess 820 of the cap 291 shown in FIG. 35 extends only for a limited height of the skirt 17. More in particular, the recess 820 extends in the closure element 4 from the separation line 11 for a pre-established dimension, in a direction parallel to a longitudinal axis of the cap 291, said pre-established dimension being smaller than the height of the skirt 17. The recess 820 could extend, up to a certain height, also in the retaining ring 2, or it might not involve the retaining ring 2. The connection band 918 can be delimited by two delimitation lines 21 having the features previously described with reference to FIGS. 29 to 33.

The connection band 918 can comprise, on an inner surface thereof, the weakening lines 125 described with reference to FIGS. 29 to 33. However, this condition is not necessary and the weakening lines 125 could be absent.

The cap 291 can be produced with the method previously described, in particular with reference to FIGS. 29 to 33. In particular, the cap 291 can be produced starting from a cup-shaped body, in which the recess 820 is obtained inside the mould. The delimitation lines 21 can also be obtained in the mould, but they could also be obtained by means of a subsequent cutting operation. When the cup-shaped body has been extracted from the mould, the separation line 11 is obtained by means of a cutting operation. Owing to the recess 820, it is not necessary that the cutting operation intended to produce the separation line 11 take place only in certain angular positions of the side wall, i.e. in an angularly timed manner relative to the connection band 918. In fact, the cutting element that produces the separation line 11 can penetrate into the recess 820, without however interacting with the material forming the side wall of the cup-shaped body at the connection band 918. In other words, the connection band 18 is not affected by the cutting operations because it is too far from the cutting element.

In the example of FIG. 35, the cap 291 is externally provided with a plurality of knurls 44, which can extend parallel to a longitudinal axis of the cap 291. The knurls 44 can be present in the closure element 4, in the retaining ring 2 and in the connecting portion 8. However, this configuration is not necessary. The skirt 17 of the closure element 4 of the cap 291 can be internally threaded. In this case, the knurls 44 help the user to grip the cap 291 firmly while the latter is being unscrewed to disengage the closure element 4 from the neck, before rotating the closure element 4 about the hinge structure 296.

However, the closure element 4 of the cap 291 could also not be internally threaded and could be internally conformed like the cap 191 of FIGS. 29 to 33. In this case, the knurls 44 can be absent.

FIGS. 25 to 28 show a cap 91 according to an alternative embodiment, which exhibits numerous similarities with the cap 191 shown in FIGS. 29 to 33. The cap 91 of FIGS. 25 to 28 differs from the cap 191 mainly in that the closure element 4 is joined to the retaining ring 2 by means of a hinge structure 86 comprising a connection band 418, externally delimited by a surface flush with the outer surface of the skirt 17 of the closure element 4. That is, the recess housing the connection band is not present, unlike in the case of the embodiment of FIGS. 29 to 33.

This is due to the fact that the cap 91 is produced using the method described with reference to FIG. 5. In this case, the connection band 418 is laterally delimited by delimitation lines 221 conformed as cuts, in particular passing through the entire thickness of the skirt 17. The delimitation lines 221 are produced after the cup-shaped body has been extracted from the mould, during a cutting step in which the separation line 11 is also produced. Naturally, in this case the cut giving rise to the separation line 11 is in a pre-established angular position relative to the cuts giving rise to the delimitation lines 221.

The cap 91 comprises a pair of weakening lines 125, whose structure and function is wholly similar to that of the weakening lines 125 of the cap 191 shown in FIGS. 29 to 33, and which can be formed in the mould in which the cup-shaped body is produced.

In an unillustrated embodiment, the skirt 17 of the closure element 4 can be internally threaded. In this case, by rotating the closure element 4 relative to the retaining ring 2 it is possible to unscrew the closure element 4 from the neck 3 and simultaneously separate the closure element 4 from the retaining ring 2 along the separation line. However, the closure element 4 will remain joined to the retaining ring 2 along the hinge structure, about which it can be rotated.

In an unillustrated embodiment, the retaining ring 2 and the closure element 4 can be initially joined, rather than by breakable bridges 24, by a membrane of polymeric material having a reduced thickness compared to the skirt 17 and the retaining ring 2, and which extends continuously along the separation line 11. The membrane is formed outside the mould in which the cup-shaped body is obtained by cutting the material of the cup-shaped body by a thickness that is smaller than the thickness thereof, at the separation line 11. When the closure element 4 is brought into the open position for the first time, the membrane will break, thereby generating the separation line 11. Owing to the membrane, the user can easily verify whether the cap has already been opened. Furthermore, owing to the membrane, the passage of contaminating substances towards the neck of the container through the separation line 11 prior to the opening of the cap is practically precluded.

Summing up, in a first aspect of the invention, there is provided a cap for a container, comprising:
- a retaining ring (2) suitable for being associated with a neck (3) of the container, the retaining ring (2) extending about an axis (Z);
- a closure element (4) for opening or closing an opening (5) defined by the neck (3) of the container;
- a hinge structure (6; 306; 406; 706) interposed between the closure element (4) and the retaining ring (2) for allowing the closure element (4) to be rotated relative to the retaining ring (2);
- wherein the hinge structure (6; 306; 406; 706) comprises at least two connection bands (18; 218; 718) that connect the closure element (4) to the retaining ring (2), a cutting line (19; 319) being interposed between said at least two connection bands (18; 218; 718), the cutting line (19; 319) extending transversely, in particular perpendicularly, to the axis (Z).

In an embodiment, the hinge structure (6; 306; 406) is so configured that, when the closure element (4) is rotated into an open position, mutually facing edges (22, 23) of the cutting line (19; 319) interfere with each other in order to prevent the closure element (4) from accidentally closing.

In an embodiment, the cap further comprises a projection (26; 32) that projects outward from a region of the closure element (4) interposed between the connection bands (18; 218; 718).

In an embodiment, the hinge structure (6; 706) is so configured that, when the closure element (4) is rotated into an open position, the projection (26; 32) interferes with the retaining ring (2) in order to prevent the closure element (4) from accidentally closing.

In an embodiment, the hinge structure (6; 306; 406; 706) is configured to generate a vibration perceivable by a user when the closure element (4) is moved from a closed position to an open position or vice versa, the vibration possibly being accompanied by a sound like a "click".

In an embodiment, each connection band (718) is delimited, on one side, by a delimitation line (21; 221) and, on the other side, by the cutting line (719).

In an embodiment, each connection band (18; 218) is laterally delimited by two delimitation lines (21; 221).

In an embodiment, the closure element (4) comprises a transverse wall (7) that extends transversely to the axis (Z) for closing the opening (5), the delimitation line (21; 221) or the delimitation lines (21; 221) extending up to the transverse wall (7).

In an embodiment, each connection band (18) is defined inside a recess (20) provided in a side wall of the cap, the side wall extending about said axis (Z). In an embodiment, the closure element (4) comprises a transverse wall (7) that extends transversely to the axis (Z) for closing the opening (5), each recess (20) extending up to the transverse wall (7).

In an embodiment, the retaining ring (2) and the closure element (4) are separated by a separation line (11; 111) that extends externally of the hinge structure (6; 306; 406; 706), the cap further comprising a membrane arranged along the separation line (11; 111), said membrane having a reduced thickness compared to neighbouring zones of the cap so as to be broken when the closure element (4) is opened for the first time.

In an embodiment, there is provided a combination of a cap according to the first aspect of the invention and a neck (3) of a container, wherein the hinge structure is so configured that, when the closure element (4) is rotated into an open position, the closure element (4) interferes with the neck (3) in order to prevent the closure element (4) from accidentally closing.

In an embodiment of the above-mentioned combination, in the open position, an edge (23) that delimits the cutting line (19; 319) towards the closure element (4) interferes with an edge portion (31) delimiting the neck (3) at the top thereof, in order to prevent the closure element (4) from accidentally closing.

In a further aspect of the invention, there is provided a cap for a container, comprising:
- a retaining ring (2) suitable for being associated with a neck (3) of the container, said retaining ring (2) extending about an axis (Z);
- a closure element (4) for opening or closing an opening (5) defined by the neck (3) of the container;
- a hinge structure (76) interposed between the closure element (4) and the retaining ring (2) for allowing the closure element (4) to be rotated relative to the retaining ring (2) between a closed position and an open position;
- wherein the hinge structure (76) comprises a connection band (118) which connects the closure element (4) to the retaining ring (2), the connection band (118) having a projecting part (36; 136) which projects towards the outside of the cap in the closed position, the projecting part (36; 136) being deformable so as to bend towards the inside of the cap when the closure element (4) is rotated towards the open position.

In an embodiment, the projecting part (36) is conformed as a portion of a curved wall which, in the closed position, has a concavity facing towards the inside of the cap, or the projecting part (136) is conformed as a cusp which, in the closed position, projects towards the outside of the cap.

In an embodiment, the closure element (4) has a recess (720) in which the projecting part (36; 136) is housed.

According to a further aspect of the invention, there is provided a cap for a container, comprising:
- a retaining ring (2) suitable for being associated with a neck (3) of the container, said retaining ring (2) extending about an axis (Z);
- a closure element (4) for opening or closing an opening (5) defined by the neck (3) of the container;
- a hinge structure (86; 96; 296) interposed between the closure element (4) and the retaining ring (2) for allowing the closure element (4) to be rotated relative to the retaining ring (2) between a closed position and an open position;
- wherein the hinge structure (86; 96; 296) comprises a connection band (318; 418; 918) which connects the closure element (4) to the retaining ring (2), the connection band (318; 418; 918) having at least two weakening lines (125) arranged transversely to said axis (Z), said at least two weakening lines (125) defining respective sequential lines of rotation about which the closure element (4) is configured to rotate, in sequence, while passing from the closed position to the open position or vice versa.

In an embodiment, the hinge structure (86; 96; 296) is so configured that, when the closure element (4) is rotated towards the open position, a portion of the connection band (318; 418; 918) interposed between said at least two weakening lines (125) is deformed towards the inside of the cap, in order to prevent the closure element (4) from accidentally closing.

In further aspect of the invention, there is provided a cap for a container, comprising:
- a retaining ring (2) suitable for being associated with a neck (3) of the container, said retaining ring (2) extending about an axis;
- a closure element (4) for opening or closing an opening (5) defined by the neck (3) of the container;
- a hinge structure (6; 86; 96; 296; 306; 406; 706) interposed between the closure element (4) and the retaining ring (2) for allowing the closure element (4) to be rotated relative to the retaining ring (2) between an open position and a closed position;
- wherein the closure element (4) comprises a transverse wall (7) and an annular side wall (17) connected to the transverse wall (7), the annular side wall (17) being internally provided with one or more hooking elements (42; 142) suitable for engaging with the neck (3) of the container to keep the closure element (4) in the closed position.

The invention claimed is:

1. A cap for a container, comprising:
a retaining ring suitable for being associated with a neck of the container, the retaining ring extending about an axis;
a closure element for opening or closing an opening defined by the neck of the container, the closure element comprising a transverse wall that extends transversely to the axis for closing the opening;
a hinge structure interposed between the closure element and the retaining ring for allowing the closure element to be rotated relative to the retaining ring;
wherein the retaining ring and the closure element are separated by a separation line, that extends externally of the hinge structure, and
wherein the hinge structure comprises at least one connection band which connects the closure element to the retaining ring, the connection band being defined inside a recess provided in a side wall of the cap, the side wall extending about said axis,
wherein said recess extends up to the transverse wall and is delimited by a substantially cylindrical wall coaxial with the side wall of the cap.

2. A cap according to claim 1, wherein the connection band is laterally delimited by two delimitation lines.

3. A cap according to claim 2, wherein the closure element comprises a transverse wall that extends transversely to the axis for closing the opening, the delimitation lines extending up to the transverse wall.

4. A cap according to claim 1, wherein the connection band has at least two weakening lines arranged transversely to said axis and defining respective sequential lines of rotation about which the closure element is configured to rotate, in sequence, thereby passing from a closed position to an open position or vice versa.

5. A cap according to claim 1, wherein the hinge structure is defined only by at least one connection band which connects the closure element to the retaining ring.

6. A cap according to claim 1, wherein the hinge structure is defined only by a single connection band which connects the closure element to the retaining ring.

7. A cap according to claim 1, wherein the hinge structure is defined only by at least two connection bands which connect the closure element to the retaining ring, a cutting line being interposed between said at least two connection bands, the cutting line extending transversely to the axis.

8. A cap for a container, comprising:
a retaining ring suitable for being associated with a neck of the container, the retaining ring extending about an axis;
a closure element for opening or closing an opening defined by the neck of the container, the closure element comprising a transverse wall that extends transversely to the axis for closing the opening;
a hinge structure interposed between the closure element and the retaining ring for allowing the closure element to be rotated relative to the retaining ring;
wherein the retaining ring and the closure element are separated by a separation line, that extends externally of the hinge structure, and
wherein the hinge structure comprises at least one connection band which connects the closure element to the retaining ring, the connection band being defined inside a recess provided in a side wall of the cap, the side wall extending about said axis,
wherein said recess extends up to the transverse wall and wherein the connection band is laterally delimited by two delimitation lines extending up to the transverse wall.

* * * * *